US012079901B2

(12) United States Patent
Xu

(10) Patent No.: US 12,079,901 B2
(45) Date of Patent: Sep. 3, 2024

(54) HIERARCHICAL IMAGE GENERATION VIA TRANSFORMER-BASED SEQUENTIAL PATCH SELECTION

(71) Applicant: ADOBE INC., San Jose, CA (US)

(72) Inventor: Ning Xu, Milpitas, CA (US)

(73) Assignee: ADOBE INC., San Jose, CA (US)

( * ) Notice: Subject to any disclaimer, the term of this patent is extended or adjusted under 35 U.S.C. 154(b) by 177 days.

(21) Appl. No.: 17/649,101

(22) Filed: Jan. 27, 2022

(65) Prior Publication Data

US 2023/0237709 A1 Jul. 27, 2023

(51) Int. Cl.

| G06T 11/00 | (2006.01) |
|---|---|
| G06T 5/00 | (2024.01) |
| G06T 5/50 | (2006.01) |
| G06T 5/77 | (2024.01) |
| G06T 7/11 | (2017.01) |
| G06V 10/26 | (2022.01) |
| G06V 10/82 | (2022.01) |

(52) U.S. Cl.
CPC ............ *G06T 11/00* (2013.01); *G06T 5/50* (2013.01); *G06T 5/77* (2024.01); *G06T 7/11* (2017.01); *G06V 10/267* (2022.01); *G06V 10/82* (2022.01); *G06T 2207/10016* (2013.01); *G06T 2207/20081* (2013.01); *G06T 2207/20132* (2013.01); *G06T 2207/20221* (2013.01); *G06T 2210/22* (2013.01)

(58) Field of Classification Search
CPC . G06T 11/00; G06T 5/005; G06T 5/50; G06T 7/11; G06T 2207/10016; G06T 2207/20081; G06T 2207/20132; G06T 2207/20221; G06T 2210/22; G06V 10/267; G06V 10/82
See application file for complete search history.

(56) References Cited

U.S. PATENT DOCUMENTS

| 10,504,264 B1 * | 12/2019 | Koenig | G06T 11/001 |
| 2018/0357519 A1 * | 12/2018 | Jin | G06V 10/764 |
| 2022/0147751 A1 * | 5/2022 | Vitek | G06F 18/2163 |

OTHER PUBLICATIONS

PHULe-Khac, P.H., Healy, G. and Smeaton, A.F., 2020; "Contrastive representation learning: A framework and review;" Ieee Access, 8, pp. 193907-193934. (Year: 2020).*
1Johnson, et al., "Image Generation from Scene Graphs", In CVPR, arXiv preprint arXiv:1804.01622v1 [cs.CV] Apr. 4, 2018, 16 pages.
2Li, et al., "PasteGAN: A Semi-Parametric Method to Generate Image from Scene Graph", In NIPS, 2019, 11 pages.

(Continued)

*Primary Examiner* — Edward Martello
(74) *Attorney, Agent, or Firm* — F. CHAU & ASSOCIATES, LLC

(57) ABSTRACT

Systems and methods for image processing are described. Embodiments of the present disclosure identify a first image depicting a first object; identify a plurality of candidate images depicting a second object; select a second image from the plurality of candidate images depicting the second object based on the second image and a sequence of previous images including the first image using a crop selection network trained to select a next compatible image based on the sequence of previous images; and generate a composite image depicting the first object and the second object based on the first image and the second image.

20 Claims, 14 Drawing Sheets

(56) References Cited

OTHER PUBLICATIONS

3Tseng, et al., "RetrieveGAN: Image Synthesis via Differentiable Patch Retrieval", In ECCV, arXiv preprint arXiv:2007.08513v1 [cs.CV] Jul. 16, 2020, 21 pages.
4Park, et al., "Semantic Image Synthesis with Spatially-Adaptive Normalization", In CVPR, arXiv preprint arXiv:1903.07291v2 [cs.CV] Nov. 5, 2019, 19 pages.
6Xu, et al., "AttnGAN: Fine-Grained Text to Image Generation with Attentional Generative Adversarial Networks", In CVPR, arXiv preprintarXiv:1711.10485v1 [cs.CV] Nov. 28, 2017, 9 pages.
6Qiao, et al., "MirrorGAN: Learning Text-to-image Generation by Redescription", In CVPR, arXiv preprint arXiv:1903.05854v1 [cs.CL] Mar. 14, 2019, pp. 4321-4330.
7Li, et al. "Controllable Text-to-Image Generation", In NIPS, arXiv preprint arXiv:1909.07083v2 [cs.CV] Dec. 19, 2019, 11 pages.
8Zhu, et al., "DM-GAN: Dynamic Memory Generative Adversarial Networks for Text-to-Image Synthesis", In CVPR, arXiv preprint arXiv:1904.01310v1 [cs.CV] Apr. 2, 2019, 9 pages.
9Li, et al., "Object-driven Text-to-Image Synthesis via Adversarial Training", In CVPR, arXiv preprint arXiv:1902.10740v1 [cs.CV] Feb. 27, 2019, 23 pages.
10Sun, et al., "Image Synthesis From Reconfigurable Layout and Style", In ICCV, 2019, pp. 10531-10540.
11Ashual, et al., "Specifying Object Attributes and Relations in Interactive Scene Generation", In ICCV, arXiv preprint arXiv:1909.05379v2 [cs.CV] Nov. 17, 2019, 12 pages.
12Zhao, et al., "Image Generation from Layout", In CVPR, arXiv preprint arXiv:1811.11389v3 [cs.CV] Oct. 14, 2019, 10 pages.
13Mirza, et al., "Conditional Generative Adversarial Nets", arXiv preprint arXiv:1411.1784v1 [cs.LG] Nov. 6, 2014, 7 pages.
14Yu, et al., "Free-Form Image Inpainting with Gated Convolution", In ICCV, arXiv preprint arXiv:1806.03589v2 [cs.CV] Oct. 22, 2019, 17 pages.
15Johnson, et al., "Perceptual Losses for Real-Time Style Transfer and Super-Resolution", In ECCV, arXiv preprint arXiv:1603.08155v1 [cs.CV] Mar. 27, 2016, 18 pages.
16Deng, et al., "ImageNet: A Large-Scale Hierarchical Image Database", In CVPR, 2009, 9 pages.
17Simonyan, et al., "Very Deep Convolutional Networks for Large-Scale Image Recognition", arXiv preprint arXiv:1409.1556v5 [cs.CV] Dec. 23, 2014, 13 pages.
18Mao, et al., "Least Squares Generative Adversarial Networks", In ICCV, arXiv preprint arXiv:1611.04076v3 [cs.CV] Apr. 5, 2017, 16 pages.

\* cited by examiner

HIERARCHICAL IMAGE GENERATION VIA TRANSFORMER-BASED SEQUENTIAL PATCH SELECTION

BACKGROUND

The following relates generally to image processing, and more specifically to image synthesis using machine learning.

Digital image processing refers to the use of a computer to edit a digital image using an algorithm or a processing network. In some examples, an image description such as a scene graph may be processed using image editing software. Image editing software is commonly used to edit images of objects. For example, image editing may be performed to increase the general appeal of an image or retrieve a diverse set of relevant images based on the image description. In some cases, image editing application is used to synthesize a composite image based on user request.

Image synthesis is a subtask within the field of image processing where an image is generated based on a description. A synthesized image includes desired content such as a set of preferred objects where the objects share similar appearance with each other. In some examples, image editing models use machine learning for generating synthesized images. For example, generative adversarial networks (GANs) can be trained to generate synthesized images.

However, conventional image editing systems are unable to generate a composite image such that the objects in the synthesized image are mutually compatible with each other. Furthermore, synthesized images from these conventional systems look less realistic and may not be consistent with user request. Therefore, there is a need in the art for improved image synthesis systems that can select mutually compatible image crops for image synthesis.

SUMMARY

The present disclosure describes systems and methods for image processing. Embodiments of the present disclosure include an image processing apparatus configured to generate a composite image based on image description such as a scene graph. In some cases, a sequential crop selection technique is used when selecting multiple compatible image crops corresponding to objects of the scene graph. These selected image crops are then input to an image generator network for subsequent image synthesis, also known as the retrieval stage. In some embodiments, a trained crop selection network can select an object crop from a set of candidate images for each object in a scene graph, where the crop selection network is trained to select a most compatible crop based on content and location information of previously chosen object crops. The crop selection network includes a transformer model and can be trained using contrastive learning. Furthermore, an image generator network is used to synthesize a composite image where the objects of the composite image are determined by the retrieved image crops using the crop selection network.

A method, apparatus, and non-transitory computer readable medium for image processing are described. One or more embodiments of the method, apparatus, and non-transitory computer readable medium include identifying a first image depicting a first object; identifying a plurality of candidate images depicting a second object; selecting a second image from the plurality of candidate images depicting the second object based on the second image and a sequence of previous images including the first image using a crop selection network trained to select a next compatible image based on the sequence of previous images; and generating a composite image depicting the first object and the second object based on the first image and the second image.

A method, apparatus, and non-transitory computer readable medium for training a neural network are described. One or more embodiments of the method, apparatus, and non-transitory computer readable medium include identifying an image depicting a first object and a second object; generating a first crop from the image, wherein the first crop includes the first object; generating a second crop from the image, wherein the second crop includes the second object; generating a third crop from a source other than the image, wherein the third crop includes the second object; identifying the first crop and the second crop as a positive sample pair; identifying the first crop and the third crop as a negative sample pair; computing a first compatibility score for the positive sample pair using a crop selection network; computing a second compatibility score for the negative sample pair using the crop selection network; computing a contrastive learning loss based on the first compatibility score and the second compatibility score; and updating parameters of the crop selection network based on the contrastive learning loss.

An apparatus and method for image processing are described. One or more embodiments of the apparatus and method include an image selection component configured to generate a plurality of candidate images depicting a same object; a crop selection network configured to select a next compatible image from the plurality of candidate images based on a sequence of previous images; and an image generator network is configured to generate a composite image based on the next compatible image and the sequence of previous images.

DETAILED DESCRIPTION

Figure 1:
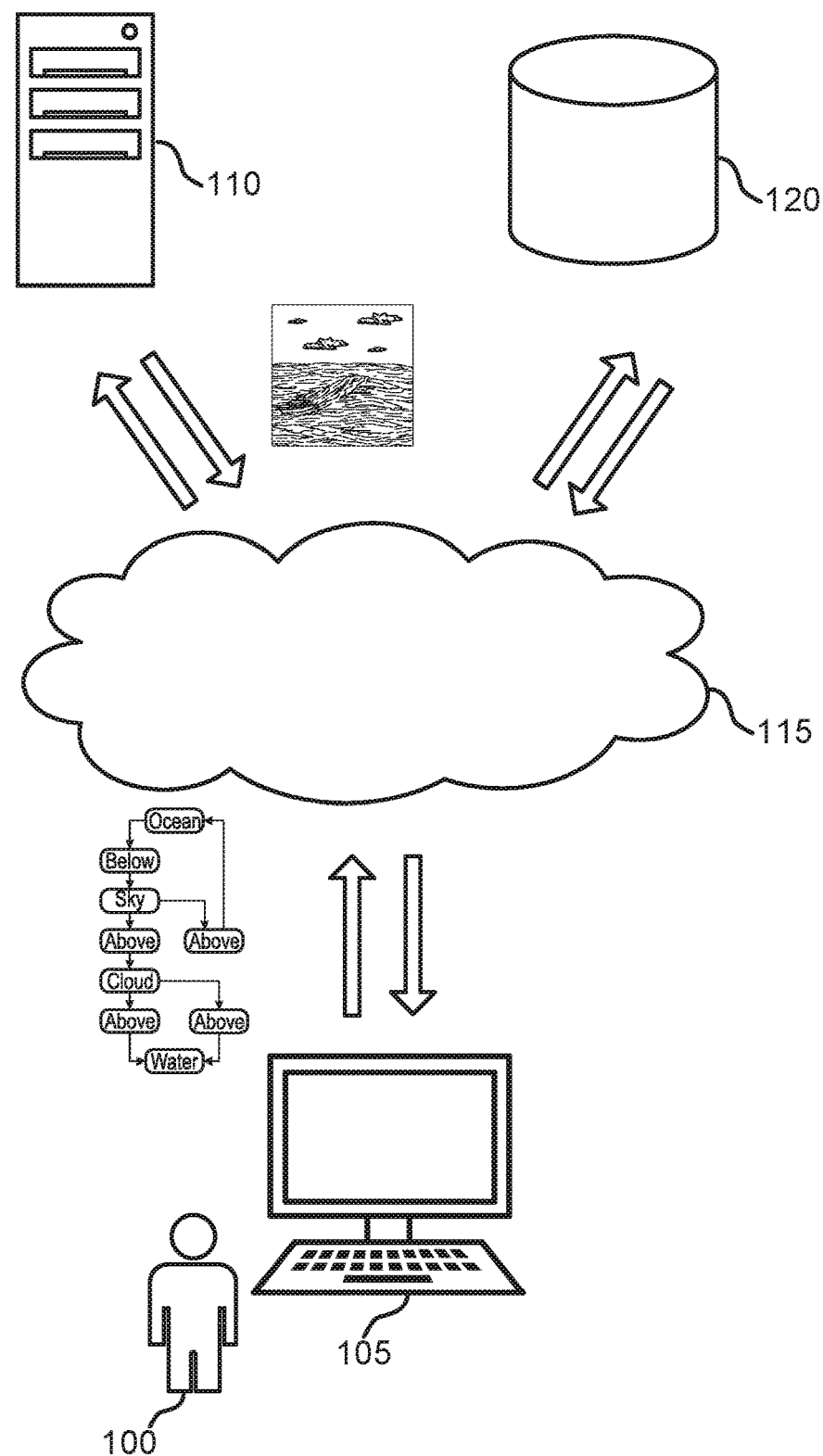
FIG. 1 shows an example of an image processing system according to aspects of the present disclosure.

The present disclosure describes systems and methods for image processing. Embodiments of the present disclosure include an image processing apparatus configured to generate a composite image based on image description such as a scene graph. In some cases, a sequential crop selection technique is used to identify and select a set of mutually compatible object crops based on objects in the scene graph as input to subsequent image synthesis, also known as the retrieval stage. In some embodiments, a trained crop selection network can select an object crop from a set of candidate images for each object in a scene graph. The crop selection network can select a most compatible crop based on content and location information of previously chosen object crops. The crop selection network includes a transformer model and can be trained using contrastive learning. By using spatially adaptive normalization module during image generation stage, embodiments of the present disclosure output a final composite image consistent with crops appearance and spatial arrangements of the objects in the scene graph. This enables generating a composite image that looks more realistic and object crops in the generated image are mutually compatible with each other.

Conventional image processing networks such as conditional generative models generate a synthesized image according to conditions such as text, segmentation mask, and layout information. In some examples, a user provides a natural language sentence indicating a set of preferred objects and their spatial relationships. In some examples, existing networks generate images based on scene descriptions using generative adversarial networks (GANs).

In some cases, conventional image processing networks use pre-defined word embeddings corresponding to a certain class of objects for image generation. However, these conventional networks are not able to incorporate spatial information and content information of the image crops that have already been selected previously. That is, a next crop corresponding to an object in the scene graph may not be compatible with the spatial, style, and content features of the image crops that have already been chosen in previous iterations. As a result, the synthesized image may not meet user expectation because the output image looks less realistic and may not be consistent with the scene graph description.

Embodiments of the present disclosure include a crop selection network using sequential crop selection technique. Some embodiments identify a set of candidate images (e.g., candidate crops) corresponding to an object in a scene graph and select a compatible crop from the set of candidate images based on previously selected crops using a transformer model. The crop selection network can embed the set of candidate images using transformer heads and incorporate spatial information from the previously chosen crops via position embedding. The crop selection network runs iterative operations and retrieves an image crop that is mutually compatible with the previously chosen crops. As a result, embodiments of the present disclosure generate a composite image that looks consistent with the objects and interactions depicted in the scene graph.

Contrastive learning is used in crop retrieval for image synthesis. In some examples, the crop selection network is trained using a contrastive learning loss, which pushes apart dissimilar pairs (referred to as negative pairs) while pulling together similar pairs (referred to as positive pairs). In some examples, an object crop from the same image as a target object is identified as a positive crop. The object crop and the target object form a positive pair. Additionally, an object crop from a different image as the target object is identified as a negative crop. The object and the target object form a negative pair. The constative learning loss is then computed based on the embeddings of the positive crop and the negative crop with regard to the target object.

By using a custom image generator network, embodiments of the present disclosure generate realistic images based on the scene graph using selected image crops as guidance. The image generator network implements a hierarchical generation method using hierarchical gated convolutions to synthesize realistic and high-resolution images. In some examples, the image generator network includes a patch-guided spatially adaptive normalization module which ensures the synthesized image and the selected crops are highly correlated. The image generator network is trained with crops selected by the crop selection network. As a result, the image generator network generates a composite image having increased mutual compatibility between the selected crops.

Furthermore, a scene graph may include multiple objects and complex interactions in the scene. Appearance of objects and relationships among objects can be captured from the scene graph via graph convolution network (GCN). Therefore, embodiments of the present disclosure can be used to generate realistic images for complex scene descriptions.

Embodiments of the present disclosure may be used in the context of image editing applications. For example, an image processing network based on the present disclosure may take a natural language query or image description (e.g., a scene graph) and efficiently select compatible image crops and generate a composite image based on the selected crops. An example application of the inventive concept in the image processing context is provided with reference to FIGS. 1-3. Details regarding the architecture of an example image processing apparatus are provided with reference to FIGS. 4-6. Example processes for image processing are provided with reference to FIGS. 7-12. Example training processes are described with reference to FIGS. 13-14.

Image Processing Application

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIG. 4.

In the example of FIG. 1, user 100 provides an image description (e.g., a scene graph or a natural language description). In some examples, user 100 provides a scene graph and is interested in receiving a set of diverse composite or synthesized images relevant to the given scene graph. The scene graph includes multiple objects or stuff (e.g., ocean, sky, cloud, water) and relationships among the objects (e.g., ocean is below sky, sky is above cloud). The user 100 communicates with the image processing apparatus 110 via the user device 105 and the cloud 115. The user device 105 transmits the image description (i.e., scene graph in this example) to the image processing apparatus 110 generates a composite image based on the scene graph.

The user device 105 may be a personal computer, laptop computer, mainframe computer, palmtop computer, personal assistant, mobile device, or any other suitable processing apparatus. In some examples, the user device 105 includes software that incorporates an image processing application (e.g., an image editing application). In some examples, the image editing application on the user device 105 may include functions of the image processing apparatus 110.

A user interface may enable a user 100 to interact with a user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser. In some examples, the image processing application may be implemented on user device 105.

A set of object crops (e.g., candidate images or candidate crops) may be stored in database 120. Image processing apparatus 110 can access database 120 and retrieve a corresponding relevant set of candidate crops depicting an object in the scene graph. Image processing apparatus 110 applies a sequential selection method to only retrieve a mutually compatible crop from the corresponding relevant set of candidate crops. In some examples, crop selection for each object depends on the contents and locations of previously chosen object crops. The composite image is synthesized based on the previously chosen object crops. The composite image is then returned to user 100 via user device 105.

According to some embodiments, image processing apparatus 110 identifies a first image depicting a first object; identifies a plurality of candidate images depicting a second object; selects a second image from the plurality of candidate images depicting the second object based on the second image and a sequence of previous images including the first image using a crop selection network trained to select a next compatible image based on the sequence of previous images; and generates a composite image depicting the first object and the second object based on the first image and the second image. The image processing apparatus 110 returns the composite image to user 100. The process of using the image processing apparatus 110 is further described with reference to FIG. 2.

Image processing apparatus 110 includes a computer implemented network comprising an image selection component, a crop selection network, and an image generator network. In some examples, the image selection component of image processing apparatus 110 further includes a graph convolutional network (GCN) and a text encoder.

Image processing apparatus 110 may also include a processor unit, a memory unit, an I/O module, and a training component. The training component is used to train a machine learning model (or an image processing network). Additionally, the image processing apparatus 110 can communicate with database 120 via the cloud 115. In some cases, the architecture of the image processing network is also referred to as a network or a network model. Further detail regarding the architecture of the image processing apparatus 110 is provided with reference to FIGS. 4-6.

Further detail regarding the operation of the image processing apparatus 110 is provided with reference to FIGS. 7-12.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, database 120 stores data such as storing candidate images or candidate object crops in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
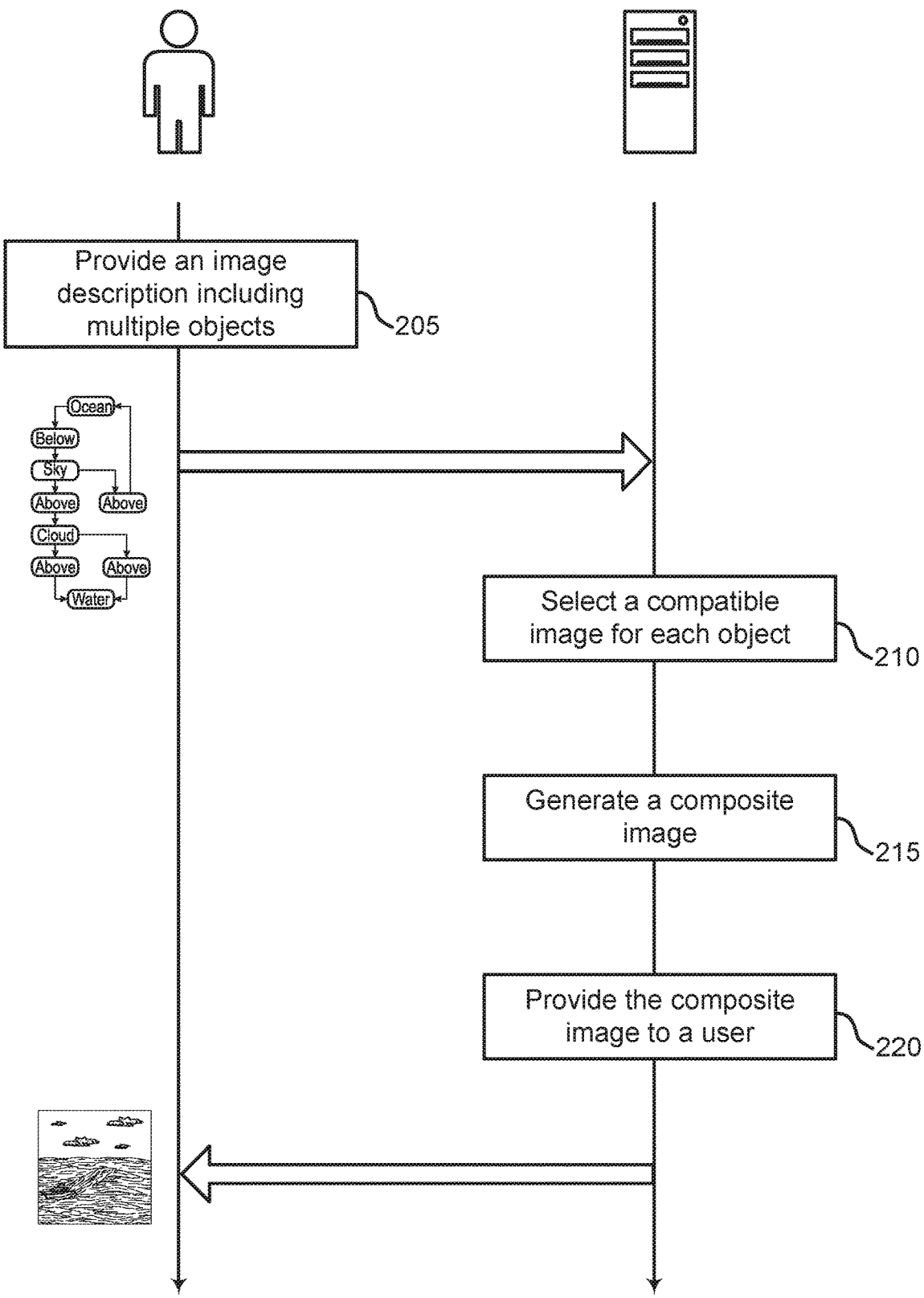
FIG. 2 shows an example of generating a composite image based on image description according to aspects of the present disclosure.

FIG. 2 shows an example of generating a composite image based on image description according to aspects of the present disclosure. The image processing apparatus can be used in an image editing application to perform image synthesis based on image description. In some examples, a user is interested in generating a set of diverse composite images consistent with a scene graph. The image processing apparatus identifies a set of object crops that are mutually compatible for image generation. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, a user provides an image description including multiple objects. In some cases, the operations of this step refer to, or may be performed by, user as described with reference to FIG. 1. The image description includes a scene description with multiple objects and complicated interactions. Image processing apparatus (FIG. 1) enables user controllable image synthesis from flexible scene descriptions. Users provide a scene description (e.g., a scene graph. As the example illustrated in FIG. 1, the scene descriptions define multiple objects (e.g., ocean, sky, cloud, and water) and the associated interactions (e.g., ocean below sky, sky above cloud).

At operation 210, the system selects a compatible image for each object. In some cases, the operations of this step refer to, or may be performed by, image processing apparatus as described with reference to FIGS. 1 and 4. In some cases, the system identifies a set of candidate object crops (an external pool) corresponding to an object in the image description (e.g., scene graph). At the retrieval stage, the system selects object crops that are mutually compatible for synthesizing a composite image. Additionally, the retrieved object crops are consistent with the corresponding scene graph. According to an embodiment, the system selects an image crop from a corresponding set of candidate crops, where the image crop is compatible with one or more previously selected crops. The retrieval stage is a sequential process.

At operation 215, the system generates a composite image. In some cases, the operations of this step refer to, or may be performed by, image processing apparatus as described with reference to FIGS. 1 and 4. In some examples, the system uses a hierarchical generation method to generate a final composite image. The system includes spatially adaptive normalization module that ensures the composite image is consistent with the crop appearance and the scene graph.

At operation 220, the system provides the composite image to the user. In some cases, the operations of this step refer to, or may be performed by, image processing apparatus as described with reference to FIGS. 1 and 4. The user views the composite image and can further edit the composite image with an image editing application. In some cases, the user can provide a different image or scene description. The system outputs one or more composite images based on the different image description. The set of composite images is diverse. In some cases, the composite image may also be referred to as a synthesized image.

Figure 3:
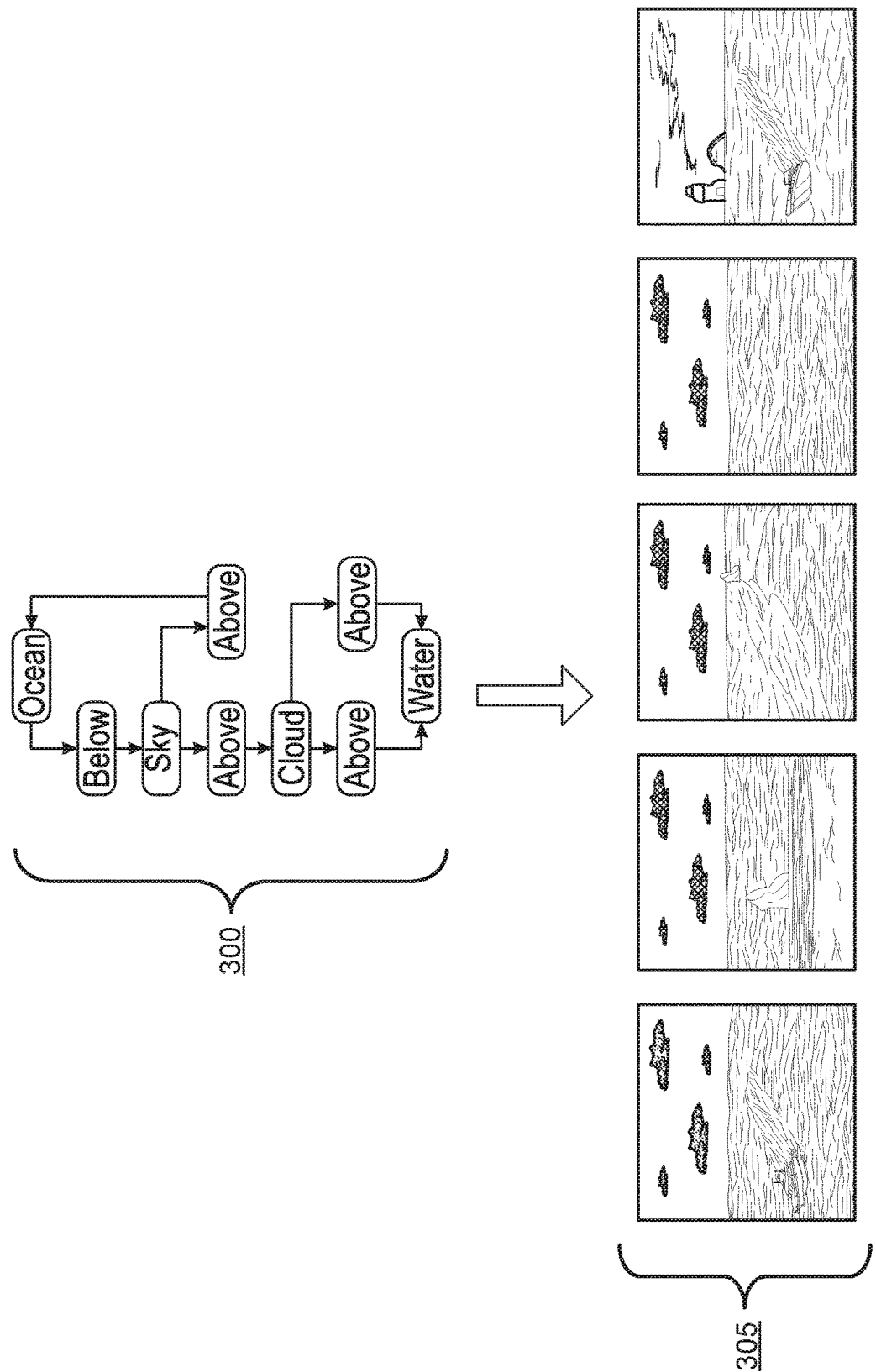
FIG. 3 shows an example of a scene graph and synthesized images based on a scene graph according to aspects of the present disclosure.

FIG. 3 shows an example of a scene graph 300 and synthesized images 305 depicting scene graph 300 according to aspects of the present disclosure. Image processing apparatus receives the scene graph 300 from a user and outputs one or more synthesized images 305 based on the scene graph 300. The example shown includes scene graph 300 and synthesized images 305.

Scene graph 300 captures objects and structural relationships among the objects. Scene graph 300 may be provided by a user. In FIG. 3, scene graph 300 indicates relationships or interactions among multiple objects such as ocean is below sky, sky is above cloud, cloud is above water, etc. The synthesized images 305 are generated by an image generator network based on scene graph 300. The synthesized images 305 are consistent with the scene graph 300. In some examples, synthesized images 305 are diverse as illustrated in FIG. 3 and are based on dataset Visual Genome. The image processing apparatus (FIG. 1) can synthesize relatively more diverse images by setting different crops to initialize the set of chosen crops in crop selection network (will be described in FIG. 4 below).

In some examples, COCO-Stuff dataset may be used for evaluating the image processing apparatus under different settings (e.g., predicted and ground-truth bounding boxes). In some examples, ground truth of bounding box is optional.

Network Architecture

Figure 4:
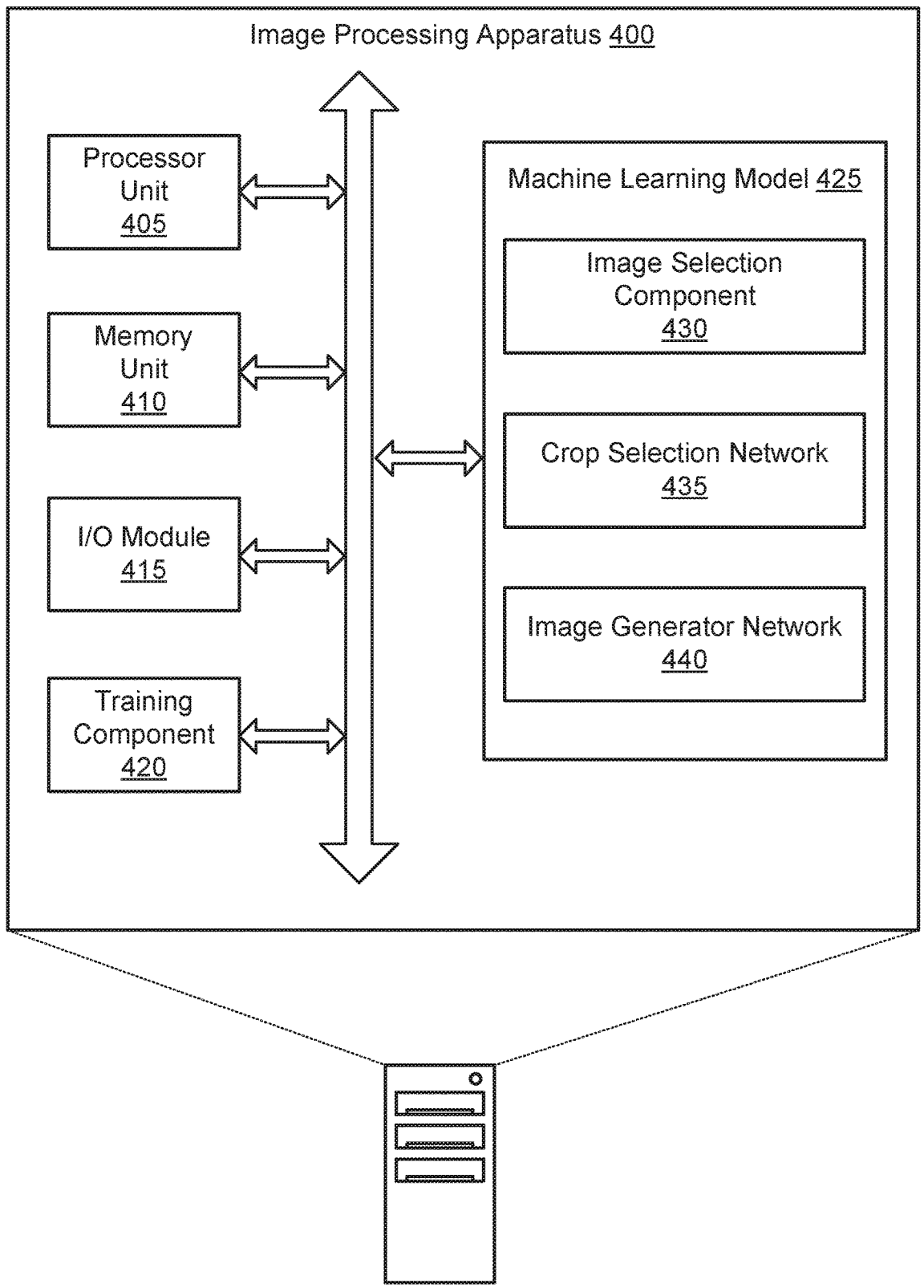
FIG. 4 shows an example of an image processing apparatus according to aspects of the present disclosure.
Figure 5:
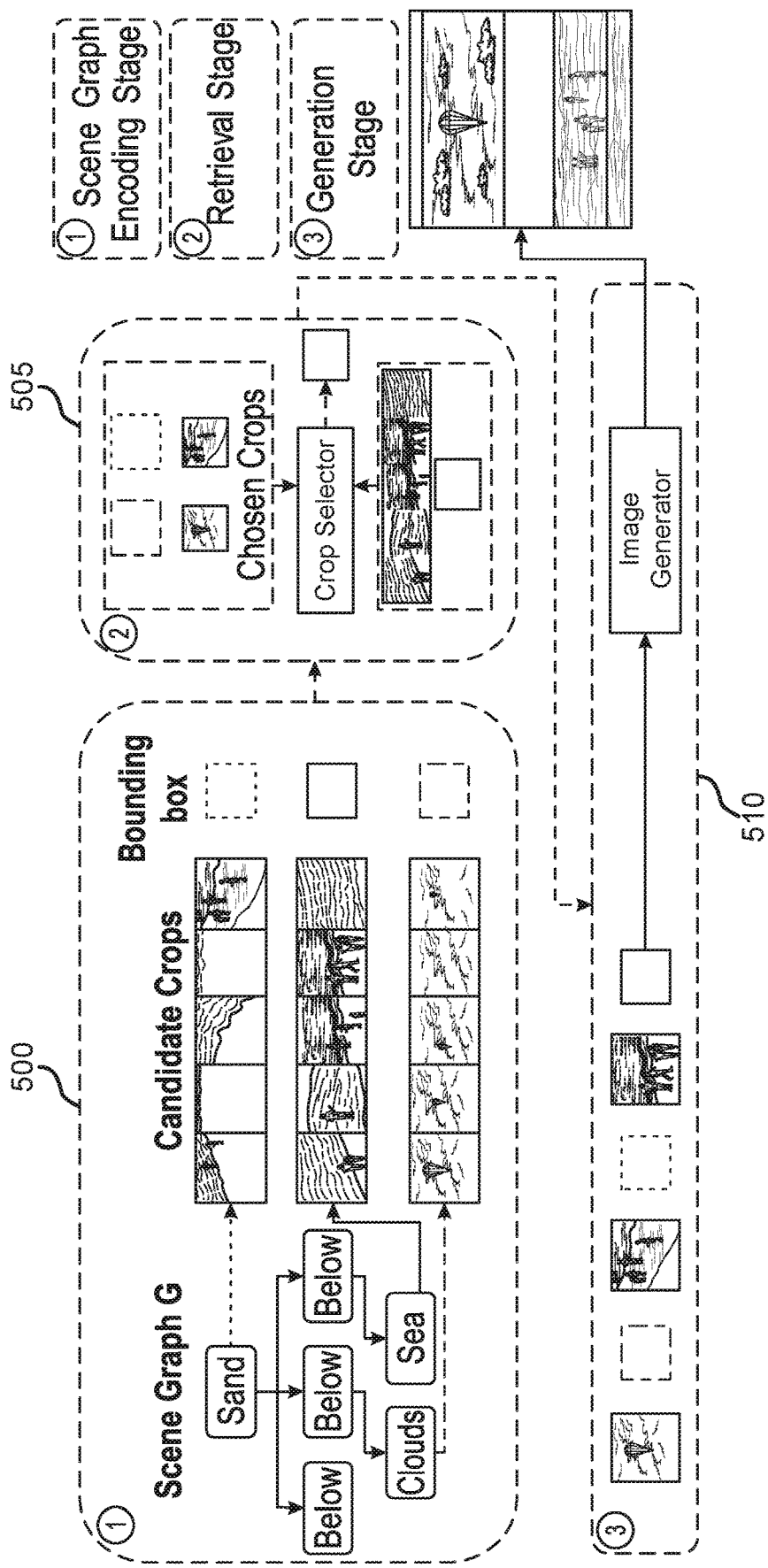
FIG. 5 shows an example of a machine learning model for image processing according to aspects of the present disclosure.
Figure 6:
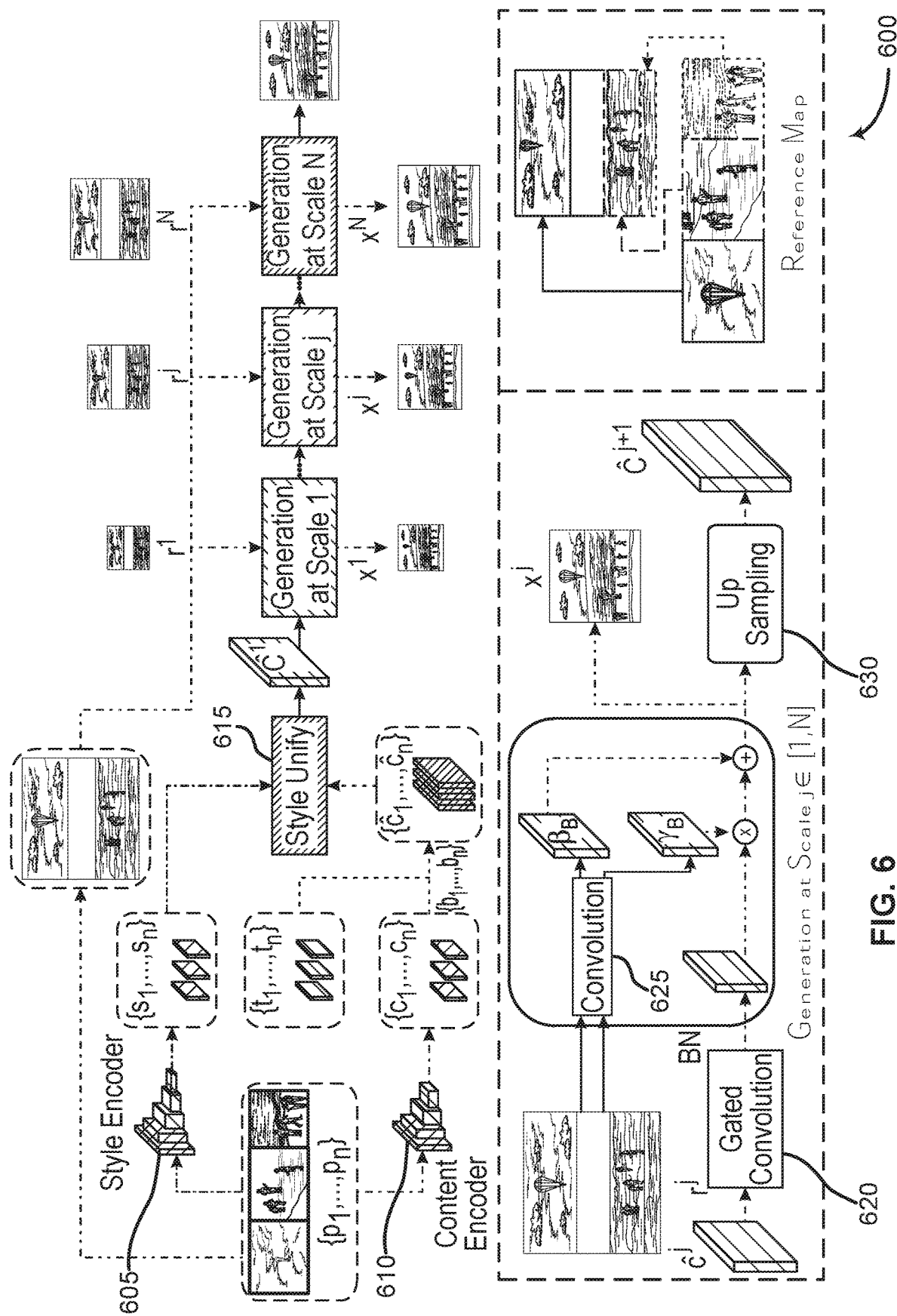
FIG. 6 shows an example of an image generator network according to aspects of the present disclosure.

In FIGS. 4-6, an apparatus and method for image processing are described. One or more embodiments of the apparatus and method include an image selection component configured to generate a plurality of candidate images depicting a same object; a crop selection network configured to select a next compatible image from the plurality of candidate images based on a sequence of previous images; and an image generator network is configured to generate a composite image based on the next compatible image and the sequence of previous images.

In some examples, the image selection component comprises a graph convolutional network (GCN) configured to generate a scene graph embedding based on a scene graph including the same object, wherein the plurality of candidate images are generated based on the scene graph embedding. In some examples, the image selection component comprises a text encoder configured to generate a text embedding of the same object.

FIG. 4 shows an example of an image processing apparatus 400 according to aspects of the present disclosure. The example shown includes image processing apparatus 400, processor unit 405, memory unit 410, I/O module 415, training component 420, and machine learning model 425. In one embodiment, machine learning model 425 includes image selection component 430, crop selection network 435, and image generator network 440. Image processing apparatus 400 is an example of, or includes aspects of, the corresponding element described with reference to FIG. 1.

A processor unit 405 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 405 is configured to operate a memory array using a memory controller. In other cases, a memory controller is integrated into the processor. In some cases, the processor unit 405 is configured to execute computer-readable instructions stored in a memory to perform various functions. In some embodiments, a processor unit 405 includes special purpose components for modem processing, baseband processing, digital signal processing, or transmission processing.

Examples of a memory unit 410 include random access memory (RAM), read-only memory (ROM), or a hard disk. Examples of memory unit 410 include solid state memory and a hard disk drive. In some examples, a memory unit 410 is used to store computer-readable, computer-executable software including instructions that, when executed, cause a processor to perform various functions described herein. In some cases, the memory unit 410 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 410 store information in the form of a logical state.

I/O module 415 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

In some examples, I/O module 415 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, image processing apparatus 400 includes a computer implemented artificial neural network (ANN) for selecting compatible images (e.g., crops) based on previously selected sequence of crops and generating a composite image depicting multiple objects. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, training component 420 identifies an image depicting a first object and a second object. In some examples, training component 420 generates a first crop from the image, where the first crop includes the first object. Training component 420 generates a second crop from the image, where the second crop includes the second object. Training component 420 generates a third crop from a source other than the image, where the third crop includes the second object. Training component 420 identifies the first crop and the second crop as a positive sample pair. Training component 420 identifies the first crop and the third crop as a negative sample pair. In some examples, training component 420 computes a contrastive learning loss based on the first compatibility score and the second compatibility score. Then, training component 420 updates parameters of the crop selection network 435 based on the contrastive learning loss.

In some examples, training component 420 compares the composite image to a ground truth image to obtain a reconstruction loss. In some examples, training component 420 updates parameters of the image generator network 440 based on the reconstruction loss. In some examples, training component 420 generates a perceptual loss based on the composite image and the ground truth image, where the parameters of the image generator network 440 are based on the perceptual loss. In some examples, training component 420 generates an adversarial loss based on the composite image and the ground truth image, where the parameters of the image generator network 440 are based on the adversarial loss. In some examples, training component 420 generates a consistency loss based on the set of composite images, where the parameters of the image generator network 440 are based on the consistency loss.

According to some embodiments, machine learning model 425 identifies a first image depicting a first object. Image selection component 430 identifies a set of candidate images depicting a second object. In some examples, image selection component 430 identifies a scene graph including the first object and the second object. Image selection component 430 generates a text embedding of the first object and a text embedding of the second object. Image selection component 430 generates a scene graph embedding of the second object based on the scene graph, the text embedding of the first object, and the text embedding of the second object, where the set of candidate images are selected based on the scene graph embedding.

In some examples, image selection component 430 generates a text embedding of the first object. Image selection component 430 generates a scene graph embedding of the first object based on the scene graph. Image selection component 430 identifies a set of candidate images depicting the first object. In some examples, image selection component 430 identifies a set of candidate images depicting a third object. In some examples, image selection component 430 generates bounding box information for each of a set of images depicting the second object. In some examples, image selection component 430 crops each of the set of images to obtain the set of candidate images depicting the second object based on the bounding box information.

According to some embodiments, image selection component 430 is configured to generate a plurality of candidate images depicting a same object. In some examples, the image selection component 430 includes a graph convolutional network (GCN) configured to generate a scene graph embedding based on a scene graph including the same object, where the set of candidate images are generated based on the scene graph embedding. The image selection component 430 includes a text encoder configured to generate a text embedding of the same object.

A GCN is a type of neural network that defines convolutional operation on graphs and uses their structural information. For example, a GCN may be used for node classification (e.g., documents) in a graph (e.g., a citation network), where labels are available for a subset of nodes using a semi-supervised learning approach. A feature description for every node is summarized in a matrix and uses a form of pooling operation to produce a node level output. In some cases, GCNs use dependency trees which enrich representation vectors for certain terms of an input phrase/sentence. Image selection component 430 is an example of, or includes aspects of, the corresponding element described with reference to FIG. 5.

According to some embodiments, crop selection network 435 selects a second image from the set of candidate images depicting the second object based on the second image and a sequence of previous images including the first image and crop selection network 435 is trained to select a next compatible image based on the sequence of previous images. In some examples, crop selection network 435 selects the first image from the set of candidate images depicting the first object. In some examples, crop selection network 435 selects a third image from the set of candidate images depicting the third object based on the first image, the second image, and spatial information of the third image.

In some examples, crop selection network 435 computes a compatibility score between each of the set of candidate images depicting the second object and each of the sequence of previous images, where the second image is selected based on the compatibility score. Crop selection network 435 identifies spatial information of the first image. Crop selection network 435 generates appearance features of the first image. Crop selection network 435 combines the spatial information and appearance features to obtain an embedding of the first image, where the compatibility score is based on the embedding of the first image.

In some examples, crop selection network 435 generates an embedding of each of the set of candidate images depicting the second object. Crop selection network 435 compares the embedding of each of the set of candidate images depicting the second object with the embedding of the first image to obtain the compatibility score.

According to some embodiments, crop selection network 435 computes a first compatibility score for the positive sample pair. Crop selection network 435 computes a second compatibility score for the negative sample pair using the crop selection network 435.

According to some embodiments, crop selection network 435 is configured to select a next compatible image from the plurality of candidate images based on a sequence of previous images. Crop selection network 435 is an example of, or includes aspects of, the corresponding element described with reference to FIGS. 5 and 14.

According to some embodiments, image generator network 440 generates a composite image depicting the first object and the second object based on the first image and the second image. In some examples, image generator network 440 generates content features for the first image and for the second image. Image generator network 440 generates location information for the first image and for the second image based on the corresponding content features. Image generator network 440 pastes the first image and the second image into the composite image based on the location information. In some examples, image generator network 440 inpaints a region of the composite image between the pasted first image and the pasted second image. In some examples, image generator network 440 performs spatially adaptive normalization of the composite image based on the pasted first image and the pasted second image.

In some examples, image generator network 440 generates style features for the first image and the second image. Image generator network 440 computes unified styled modulation parameters based on the style features. Image generator network 440 modifies the first image and the second image based on the unified styled modulation parameters, where the composite image is based on the modified first image and the modified second image.

In some examples, image generator network 440 generates a set of composite images corresponding to a set of scales. Image generator network 440 combines the set of composite images to obtain the composite image.

According to some aspects, image generator network 440 generates a composite image based on a first image depicting a first object and a second image depicting a second object. In some examples, image generator network 440 generates a set of composite images at different scales.

According to some aspects, image generator network 440 is configured to generate a composite image based on the next compatible image and the sequence of previous images. Image generator network 440 is an example of, or includes aspects of, the corresponding element described with reference to FIGS. 5 and 6.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 5 shows an example of a machine learning model for image processing according to aspects of the present disclosure. The machine learning model of FIG. 5 shows the relationship between elements of the image processing apparatus described with reference to FIG. 4. Referring to FIG. 4, the machine learning model includes an image selection component, a crop selection network, and an image generator network. The example shown includes image selection component 500, crop selection network 505, and image generator network 510.

Given a scene graph $\mathbb{R}$ that contains a set of n objects $O=\{o_1, \ldots, o_n\}$ and the corresponding pairwise relations $R=\{r_1, \ldots, r_m\}$, an image $x \in \mathbb{R}^{H \times W \times 3}$ is synthesized based on the scene graph $\mathcal{G}$. Detail with regards to scene graph encoding will be described in greater detail in FIG. 8. Additionally, the image selection component 500 can access an external pool of object crops (can be either segmented out or not) to facilitate the generation process. The system (i.e., image processing apparatus 400 in FIG. 4) includes three stages. In the first stage, image selection component 500 leverages the scene graph to extract semantic features which are useful for crop retrieval (i.e., crop retrieval refers to the second stage of selecting a set of image crops based on objects in the image description for image synthesis) and location prediction for each object. In the second stage, crop selection network 505 sequentially selects a most compatible crop for each object given all previously chosen crops. In some cases, crop selection network 505 is also referred to as the sequential crop selection module. In the third stage, image generator network 510 synthesizes the target image based on the scene graph features and selected crops. In some cases, image generator network 510 is also referred to as a progressive scene graph to image module.

The first stage is also known as the scene graph encoding stage. According to an embodiment, image selection component 500 processes the input scene graph to extract text embeddings for all the objects. Detail regarding generating a text embedding will be described in greater detail in FIG. 8.

Image selection component 500 is an example of, or includes aspects of, the corresponding element described with reference to FIG. 4. Crop selection network 505 is an example of, or includes aspects of, the corresponding element described with reference to FIGS. 4 and 14. Image generator network 510 is an example of, or includes aspects of, the corresponding element described with reference to FIGS. 4 and 6.

FIG. 6 shows an example of an image generator network 600 according to aspects of the present disclosure. The image generator network 600 is used in the third stage (i.e., generation stage) as described in FIG. 5. The machine learning model as described in FIG. 4 includes image generator network 600. The example shown includes image generator network 600, style encoder 605, content encoder 610, style unify component 615, gated convolutional layer 620, convolutional layer 625, and up-sampling layer 630.

According to an embodiment, the machine learning model generates a scene graph embedding, bounding box prediction, and a selected object crop for each object $o_i$ in a given scene graph. In some cases, scene-graph embedding may be represented as $t_i$, bounding box prediction as $b_i$, and a selected object crop as $p_1$ for every object $o_i$ in a given scene graph. Then, image generator network 600 leverages the inputs to generate the final image $x \in \mathbb{R}^{H \times W \times 3}$.

An image generator network 600 includes a content encoder 610 and a style encoder 605 to extract different features from the object crop $p_i$. The content encoder 610 may also be denoted as $E_c$ while style encoder 605 may be denoted as $E_s$. The output content feature of $E_c$ is used as the generator input to provide the structural information of object $o_i$ in the generated image. The output style feature of $E_s$ is used to modulate the content feature to have a unified style with the other object crops, and thus ensures that the final generated image looks realistic. In some cases, a style unify component 615 (or style unifier) is used in the image generator network 600 to handle the situation where initially retrieved candidate crop sets do not have enough compatible crops to choose (i.e., availability of sufficient compatible crops in the initially retrieved candidate crop sets).

In some embodiments, the content feature is extracted as $c_i = E_c(p_i)$, $c_i \in \mathbb{R}^{H_c \times W_c \times C_c}$. Furthermore, the spatially expanded scene-graph feature $t_1$ is combined with $c_i$ to include more semantics. Detail regarding generating content features using content encoder 610 will be described in greater detail in FIG. 11. Detail regarding generating style features using style encoder 605 and modifying an image based on unified styled modulation parameters will be described in greater detail in FIG. 12.

The image generator network 600 includes a hierarchical structure with N output scales. The image generator network 600 takes $ĉ_j$ as input at each scale $j \in [1, N]$ and produces an output image $x^j \in$ $$\mathbb{R}^{\frac{H}{2^{N-j}} \times \frac{W}{2^{N-j}} \times 3}.$$

In some cases, there are two sub-components at each scale of the image generator network 600. The first sub-component includes the gated convolution (i.e., gated convolutional layer 620) which inpaints the missing areas uncovered by any object crops. The second sub-component copies and pastes the object crops into a reference image and the selected object crops may be used to guide the structure and content of the composite image (i.e., synthesized image). Specifically, the reference image $r^j \in$ $$\mathbb{R}^{\frac{H}{2^{N-j}} \times \frac{W}{2^{N-j}} \times 1}$$

is generated by pasting the grayscales of all object crops $p_i$ onto an empty canvas based on the corresponding location $b_i$ scaled by a factor $$\frac{1}{2^{N-j}}.$$

The crops are turned into grayscale to eliminate the negative effects of possible inconsistent color styles using the style unify component 615. Next, the reference image $r^j$ is used to predict spatially adaptive normalization parameters.

Image generator network 600 is an example of, or includes aspects of, the corresponding element described with reference to FIGS. 4 and 5. Given the synthesized image output at the j-th scale, multiple losses are used to train the image generator network 600. Training image generator network 600 will be described in greater detail in FIGS. 13 and 14.

Composite Image Generation

In FIGS. 7-12, a method, apparatus, and non-transitory computer readable medium for image processing are described. One or more embodiments of the method, apparatus, and non-transitory computer readable medium include identifying a first image depicting a first object; identifying a plurality of candidate images depicting a second object; selecting a second image from the plurality of candidate images depicting the second object based on the second image and a sequence of previous images including the first image using a crop selection network trained to select a next compatible image based on the sequence of previous images; and generating a composite image depicting the first object and the second object based on the first image and the second image.

Some examples of the method, apparatus, and non-transitory computer readable medium further include identifying a scene graph including the first object and the second object. Some examples further include generating a text embedding of the first object and a text embedding of the second object. Some examples further include generating a scene graph embedding of the second object based on the scene graph, the text embedding of the first object, and the text embedding of the second object, wherein the plurality of candidate images are selected based on the scene graph embedding.

Some examples of the method, apparatus, and non-transitory computer readable medium further include generating a text embedding of the first object. Some examples further include generating a scene graph embedding of the first object based on the scene graph. Some examples further include identifying a plurality of candidate images depicting the first object. Some examples further include selecting the first image from the plurality of candidate images depicting the first object.

Some examples of the method, apparatus, and non-transitory computer readable medium further include identifying a plurality of candidate images depicting a third object. Some examples further include selecting a third image from the plurality of candidate images depicting the third object based on the first image, the second image, and spatial information of the third image using the crop selection network.

Some examples of the method, apparatus, and non-transitory computer readable medium further include generating bounding box information for each of a plurality of images depicting the second object. Some examples further include cropping each of the plurality of images to obtain the plurality of candidate images depicting the second object based on the bounding box information.

Some examples of the method, apparatus, and non-transitory computer readable medium further include computing a compatibility score between each of the plurality of candidate images depicting the second object and each of the sequence of previous images, wherein the second image is selected based on the compatibility score. Some examples further include identifying spatial information of the first image. Some examples further include generating appearance features of the first image. Some examples further include combining the spatial information and appearance features to obtain an embedding of the first image, wherein the compatibility score is based on the embedding of the first image.

Some examples of the method, apparatus, and non-transitory computer readable medium further include generating an embedding of each of the plurality of candidate images depicting the second object. Some examples further include comparing the embedding of each of the plurality of candidate images depicting the second object with the embedding of the first image to obtain the compatibility score.

Some examples of the method, apparatus, and non-transitory computer readable medium further include generating content features for the first image and for the second image. Some examples further include generating location information for the first image and for the second image based on the corresponding content features. Some examples further include pasting the first image and the second image into the composite image based on the location information.

Some examples of the method, apparatus, and non-transitory computer readable medium further include inpainting a region of the composite image between the pasted first image and the pasted second image.

Some examples of the method, apparatus, and non-transitory computer readable medium further include performing spatially adaptive normalization of the composite image based on the pasted first image and the pasted second image.

Some examples of the method, apparatus, and non-transitory computer readable medium further include generating style features for the first image and for the second image. Some examples further include computing unified styled modulation parameters based on the style features. Some examples further include modifying the first image and the second image based on the unified styled modulation parameters, wherein the composite image is based on the modified first image and the modified second image.

Some examples of the method, apparatus, and non-transitory computer readable medium further include generating a plurality of composite images corresponding to a plurality of scales. Some examples further include combining the plurality of composite images to obtain the composite image.

Figure 7:
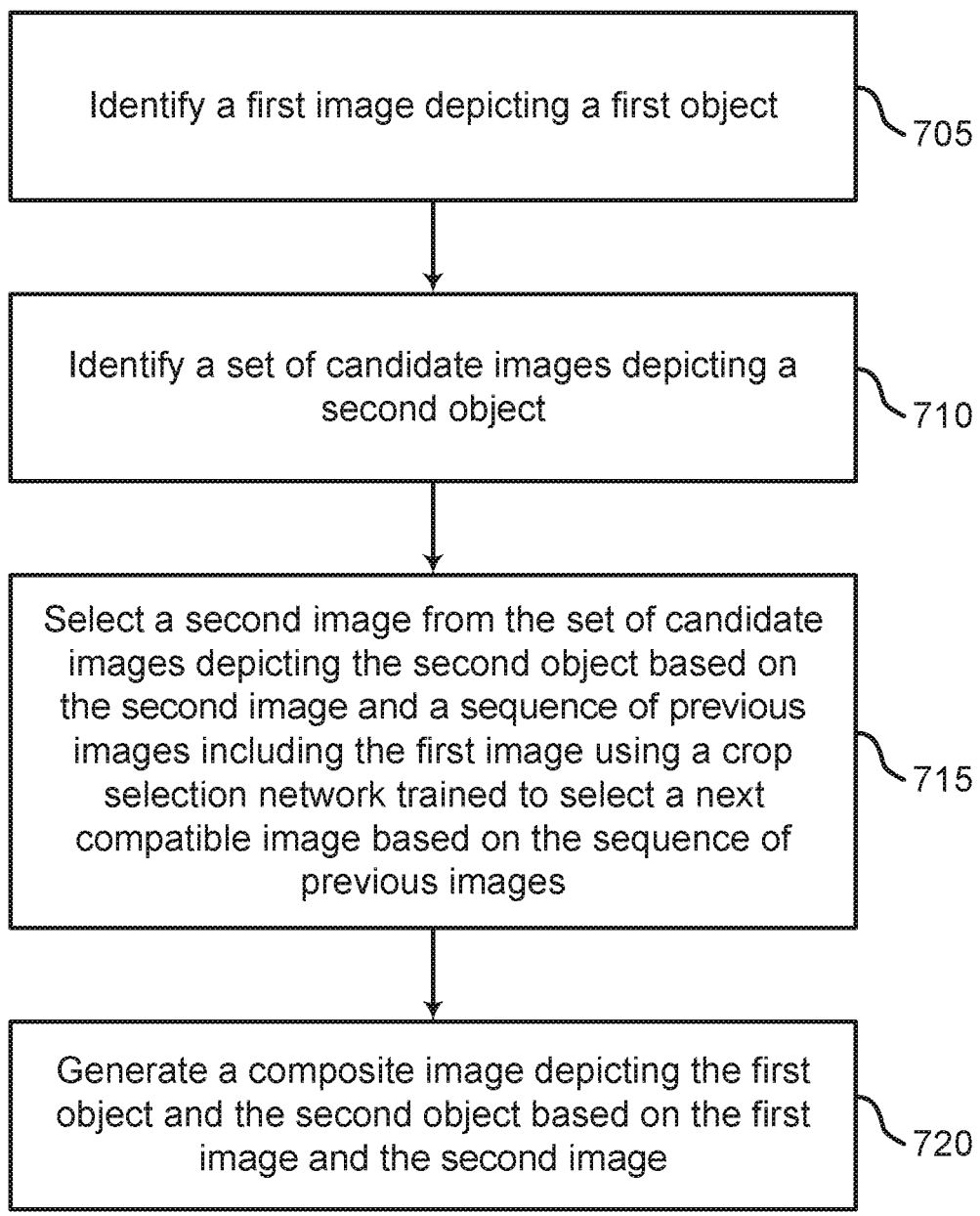
FIG. 7 shows an example of generating a composite image using a trained crop selection network according to aspects of the present disclosure.

FIG. 7 shows an example of generating a composite image using a trained crop selection network according to aspects of the present disclosure. In some examples, these operations are performed by a system including a processor executing a set of codes to control functional elements of an apparatus, such as the image processing apparatus 110 of FIG. 1. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system identifies a first image depicting a first object. In some cases, the operations of this step refer to, or may be performed by, machine learning model as described with reference to FIG. 4. In some cases, the first object is an object in a scene graph provided by user. In some examples, the first image is an image in a previously chosen crop set (i.e., the first image is selected from a set of candidate images depicting the first object using a crop selection network from a previous iteration, and hence the first image is stored in the chosen crops set). Detail regarding selecting the first image will be described below in FIG. 9. In some examples, the first image may be initialized and included in the previously chosen crop set for computing a compatibility score.

At operation 710, the system identifies a set of candidate images depicting a second object. In some cases, the operations of this step refer to, or may be performed by, image selection component as described with reference to FIGS. 4 and 5. The system can identify a pool of candidate images (i.e., candidate crops) corresponding to the second object in the scene graph. Detail regarding generating a scene graph embedding of the second object based on the scene graph will be described in FIG. 8. The system (i.e., image processing apparatus) uses the scene graph to extract semantic features which are useful for crop retrieval and location prediction for each object.

At operation 715, the system selects a second image from the set of candidate images depicting the second object based on the second image and a sequence of previous images including the first image using a crop selection network trained to select a next compatible image based on the sequence of previous images. In some cases, the operations of this step refer to, or may be performed by, crop selection network as described with reference to FIGS. 4, 5, and 14. The crop selection network as described in FIGS. 4 and 14 is used to sequentially select a most compatible crop for each object given all previously chosen crops. Selection of a compatible crop for each object in the scene graph depend on spatial, style and content features of crops (i.e., object crops) that have already been chosen in past iterations. Sequential selection method ensures retrieval of mutually compatible crops. For example, the crop selection of each object is based on contents and locations of previously chosen object crops. In some cases, the crop selection network includes a transformer model. The crop selection network may also be referred to as a sequential crop selection module. Training the crop selection network using a contrastive learning loss will be described in greater detail in FIGS. 13 and 14.

At operation 720, the system generates a composite image depicting the first object and the second object based on the first image and the second image. In some cases, the operations of this step refer to, or may be performed by, image generator network as described with reference to FIGS. 4-6. The image generator network implements a hierarchical generation method using hierarchical gated convolutions to generate the composite image (i.e., final synthesized image). In some cases, the gated convolutions are used to synthesize areas not covered by any image crops. The image generator network includes a patch-guided spatially adaptive normalization module. The spatially adaptive normalization module ensures the composite image is consistent with crop appearance and the scene graph. The composite image and the selected crops are highly correlated. As a result, the composite image looks more realistic and has high resolution. Detail regarding architecture of the image generator network is described in FIGS. 5 and 6.

Figure 8:
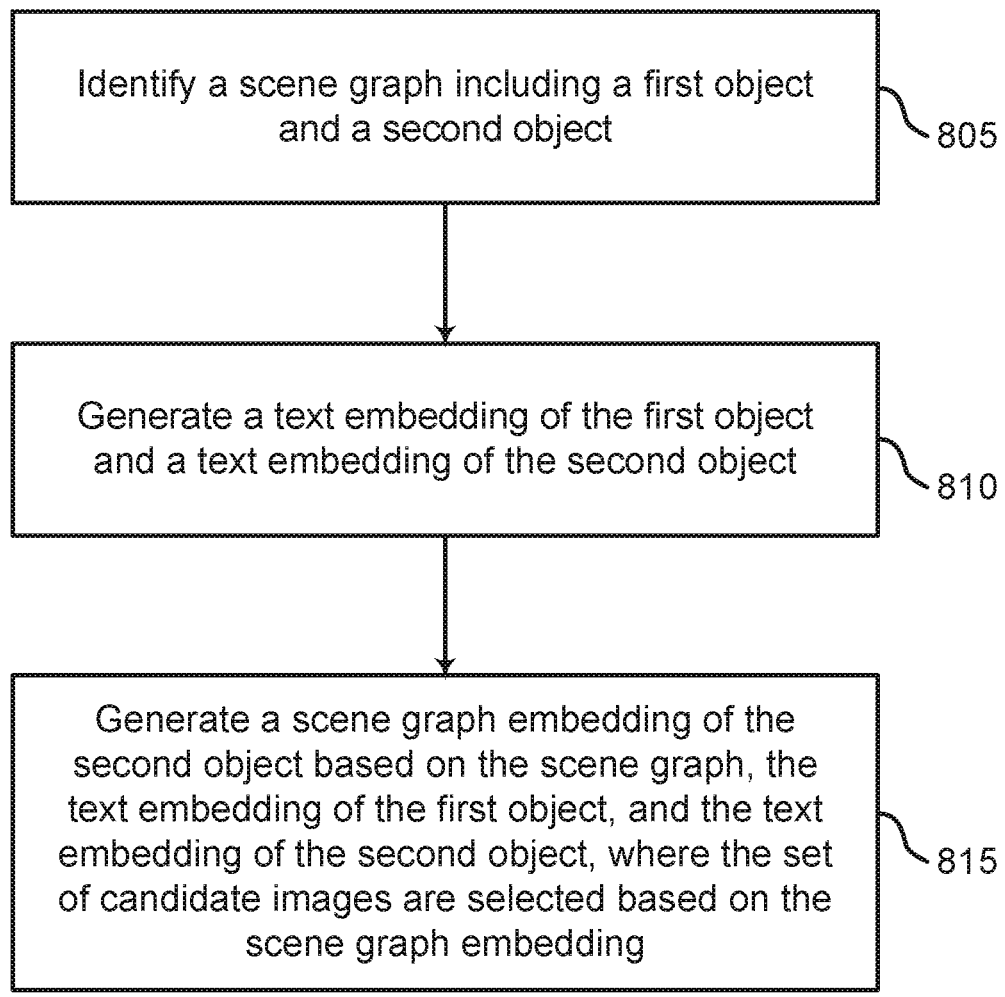
FIG. 8 shows an example of generating a scene graph embedding according to aspects of the present disclosure.

FIG. 8 shows an example of generating a scene graph embedding according to aspects of the present disclosure. FIG. 8 illustrates a process of identifying a set of candidate images depicting an object described with reference to FIG. 7. An image selection component as described in FIGS. 4 and 5 are used to generate a scene graph embedding based on a scene graph or image description provided by a user. This also corresponds to the scene graph encoding stage (i.e., the first stage) as described in FIG. 5. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system identifies a scene graph including a first object and a second object. In some cases, the operations of this step refer to, or may be performed by, image selection component as described with reference to FIGS. 4 and 5.

In some examples, a scene graph $\mathcal{G}$ contains a set of n objects $O=\{o_1, \ldots, o_n\}$ and the corresponding pairwise relations $R=\{r_1, \ldots, r_m\}$, an image $x \in \mathbb{R}^{H \times W \times 3}$ is synthesized from the scene graph.

At operation 810, the system generates a text embedding of the first object and a text embedding of the second object. In some cases, the operations of this step refer to, or may be performed by, image selection component as described with reference to FIGS. 4 and 5.

According to an embodiment, image selection component receives the input scene graph and extracts text embeddings for all the objects based on the scene graph. In some examples, text embeddings for n objects are extracted as $\{t_1, \ldots, t_n\} = E_g(O, R)$ via a graph convolutional network $E_g$, where $t_i \in \mathbb{R}^{C_t}$ is the text embedding for object $o_i$.

At operation 815, the system generates a scene graph embedding of the second object based on the scene graph, the text embedding of the first object, and the text embedding of the second object, where the set of candidate images are selected based on the scene graph embedding. In some cases, the operations of this step refer to, or may be performed by, image selection component as described with reference to FIGS. 4 and 5.

In some examples, for each object $o_i$, $t_i$ is matched with the text embeddings of other object crops in the external object pool to retrieve a set of associated candidate crops $M(o_i) = \{p_i^1, p_i^k | p_i^j \in \mathbb{R}^{H_p \times W_p \times 3}, j \in [1,k]\}$ with a fixed size k. Furthermore, $t_i$ is used to predict a bounding box location $b_i \in \mathbb{R}^4$ for object $o_i$.

Figure 9:
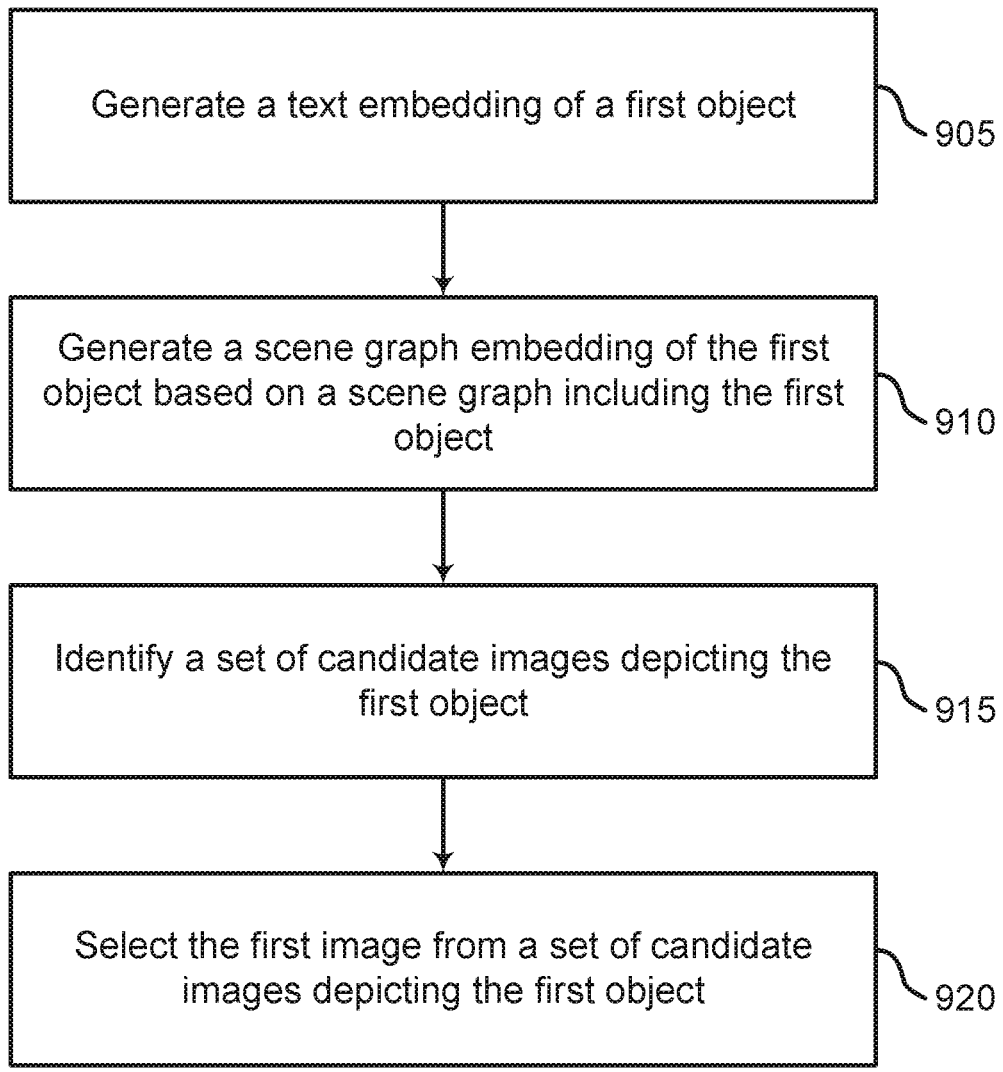
FIG. 9 shows an example of selecting an image from candidate images depicting an object according to aspects of the present disclosure.

FIG. 9 shows an example of selecting an image from candidate images depicting an object according to aspects of the present disclosure. FIG. 9 illustrates a process of selecting an image from a set of candidate images depicting a same object described with reference to FIG. 7. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system generates a text embedding of a first object. In some cases, the operations of this step refer to, or may be performed by, image selection component as described with reference to FIGS. 4 and 5. In some examples, a text encoder is used to generate the text embedding of the first object.

A word embedding is a learned representation for text where words that have the same meaning have a similar representation. Glove and Word2vec are examples of systems for obtaining a vector representation of words. GloVe is an unsupervised algorithm for training a network using on aggregated global word-word co-occurrence statistics from a corpus. Similarly, a Word2vec model may include a shallow neural network trained to reconstruct the linguistic context of words. GloVe and Word2vec models may take a large corpus of text and produces a vector space as output. In some cases, the vector space may have a large number of dimensions. Each word in the corpus is assigned a vector in the space. Word vectors are positioned in the vector space in a manner such that similar words are located nearby in the vector space. In some cases, an embedding space may include syntactic or context information in additional to semantic information for individual words.

At operation 910, the system generates a scene graph embedding of the first object based on a scene graph including the first object. In some cases, the operations of this step refer to, or may be performed by, image selection component as described with reference to FIGS. 4 and 5. A GCN may be used to generate the scene graph embedding based on a scene graph including the first object.

At operation 915, the system identifies a set of candidate images depicting the first object. In some cases, the operations of this step refer to, or may be performed by, image selection component as described with reference to FIGS. 4 and 5. The set of candidate images may be stored in database 120 as described in FIG. 1.

At operation 920, the system selects the first image from a set of candidate images depicting the first object. In some cases, the operations of this step refer to, or may be performed by, crop selection network as described with reference to FIGS. 4, 5, and 14. The first image is then stored in a previously chosen crop set. Selection of a next compatible crop corresponding to another object in the scene graph other than the first object is based on the previously chosen crop set. Detail regarding selecting a compatible image from a set of candidate images using a crop selection network will be described in greater detail in FIGS. 10 and 14.

Figure 10:
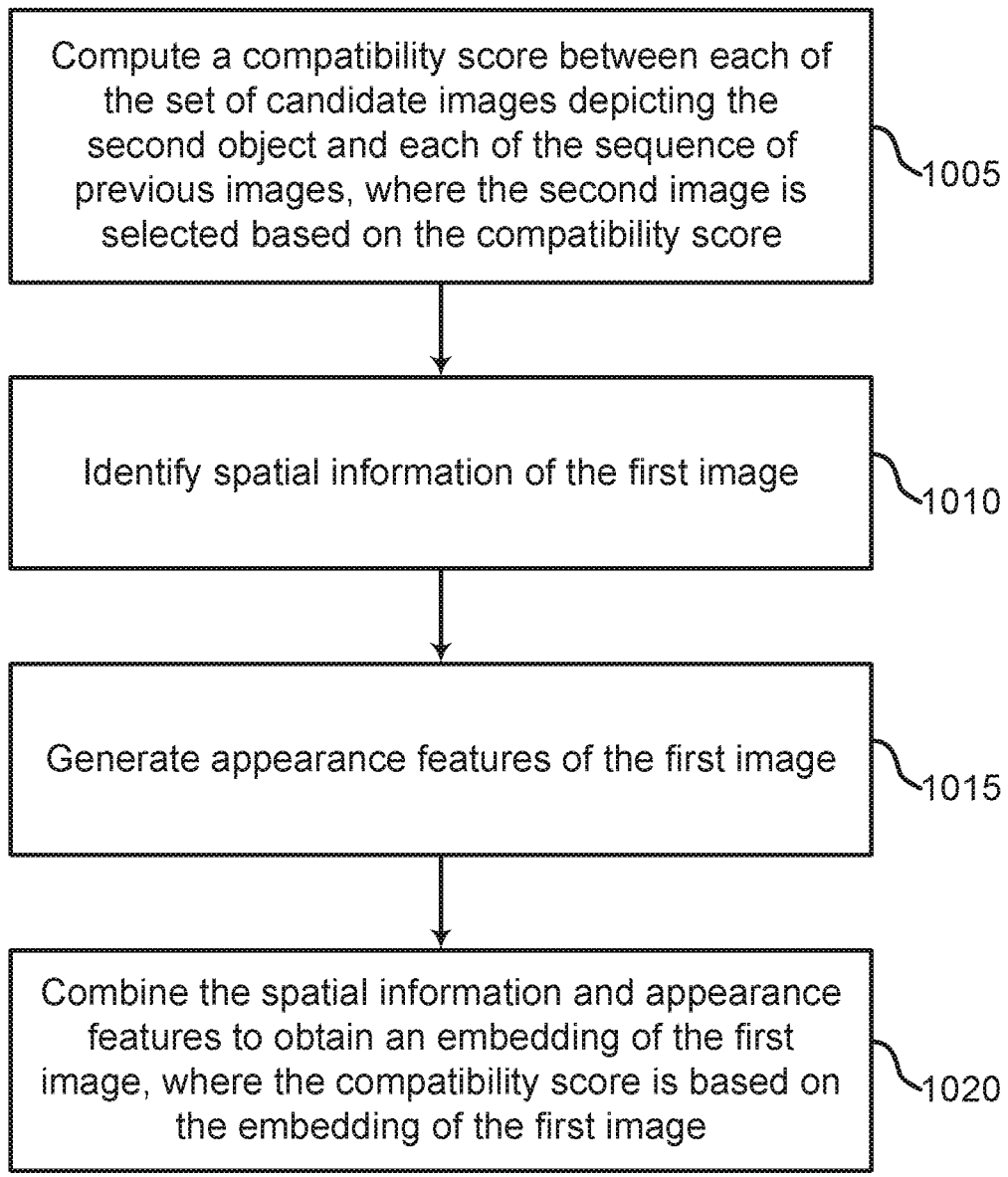
FIG. 10 shows an example of computing a compatibility score between each candidate image and each of a sequence of previous images according to aspects of the present disclosure.

FIG. 10 shows an example of computing a compatibility score between each candidate image and each of a sequence of previous images according to aspects of the present disclosure. FIG. 10 illustrates a process of selecting a next compatible image based on a sequence of previous images (e.g., previously selected crops) described with reference to FIG. 7. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system computes a compatibility score between each of the set of candidate images depicting the second object and each of the sequence of previous images, where the second image is selected based on the compatibility score. In some cases, the operations of this step refer to, or may be performed by, crop selection network as described with reference to FIGS. 4, 5, and 14.

The crop selection network is configured to select one crop to synthesize the final image (e.g., a composite image). In some cases, one crop is selected from k candidate crops associated with each object. The crop selection network performs the crop selection operation in an iterative fashion. In some cases, the set $\{p_1, \ldots, p_m\}$ can be defined as the chosen crop set P. Given a new object $o_{m+1}$, crop selection network selects one crop from the associated k candidate crops which is most compatible with all the crops in P.

The system computes a compatibility score between each of the set of candidate images depicting the second object and each of the sequence of previous images. The sequence of previous images are images previously chosen by the crop selection network in previous iterations (i.e., chosen crop set P). The compatibility score between the chosen crop set P and a new crop from the same image should be higher than the compatibility score between P and a new crop from a different image. The crop selection network is trained using contrastive learning to select object crops likely belonging to the same image, and thus increases compatibility among the selected crops.

At operation 1010, the system identifies spatial information of the first image. In some cases, the operations of this step refer to, or may be performed by, crop selection network as described with reference to FIGS. 4, 5, and 14. In some examples, crop selection network includes a transformer network. For every crop $p_i \in P$ with the corresponding predicted bounding box location $b_i$, appearance and position information are embedded as an input token to the transformer network as $f_i = W_1 \cdot p_i + E_b(b_i)$, where $W_1$ is a trainable linear transformation matrix to convert $p_i$ into a 1-dimensional embedding with shape $\mathbb{R}^{C_p}$.

At operation 1015, the system generates appearance features of the first image. In some cases, the operations of this step refer to, or may be performed by, crop selection network as described with reference to FIGS. 4, 5, and 14. Detail regarding $E_b$ (i.e., a position encoder), a learnable start token $f_0$ and the appearance input $p_0$ will be described in FIGS. 13 and 14.

At operation 1020, the system combines the spatial information and appearance features to obtain an embedding of the first image, where the compatibility score is based on the embedding of the first image. In some cases, the operations of this step refer to, or may be performed by, crop selection network as described with reference to FIGS. 4, 5, and 14.

According to an embodiment, the crop selection network computes a compatibility score between a candidate crop from a set of candidate crops and the chosen crop set P using cosine similarity between their embeddings (i.e., cosine similarity between output embedding of a start token and appearance features corresponding to the candidate crop).

Figure 11:
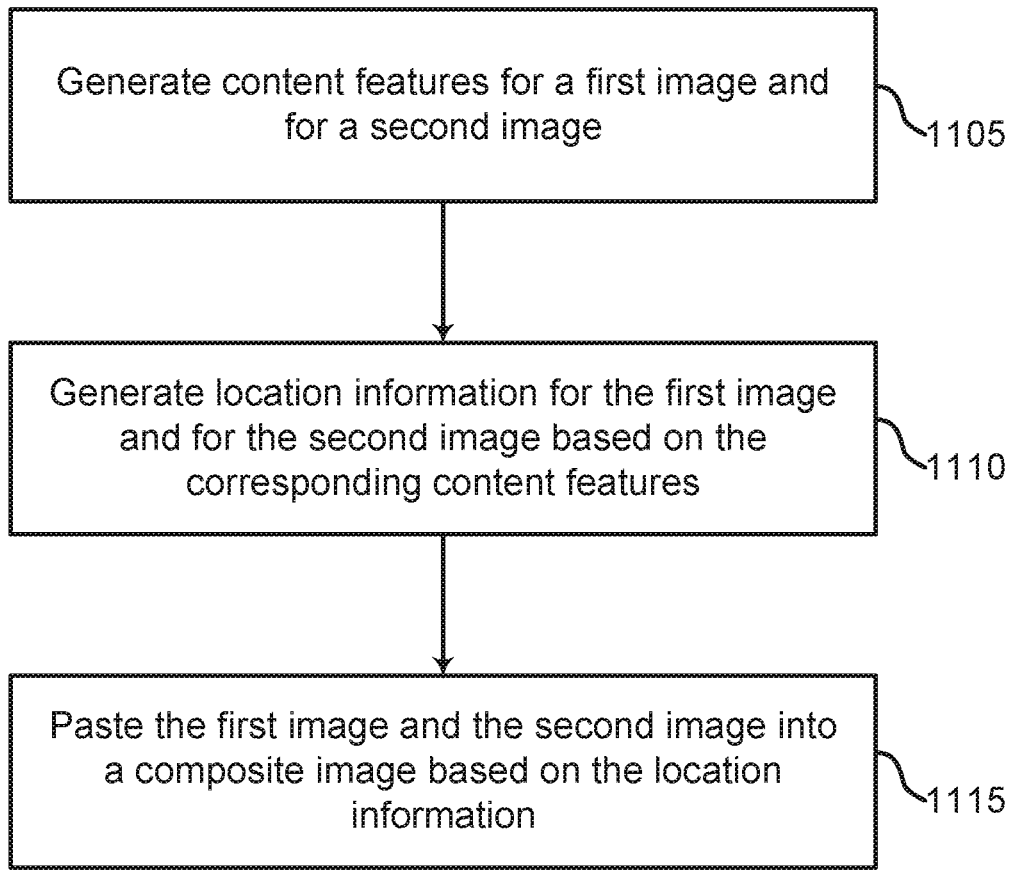
FIG. 11 shows an example of generating content features and location information according to aspects of the present disclosure.

FIG. 11 shows an example of generating content features and location information according to aspects of the present disclosure. FIG. 11 illustrates a process of generating a composite image described with reference to FIG. 7. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system generates content features for a first image and for a second image. In some cases, the operations of this step refer to, or may be performed by, image generator network as described with reference to FIGS. 4-6. An image generator network includes a content encoder $E_c$. The output content feature of $E_c$ is used as the generator input to provide the structural information of object $o_i$ in the generated image. In some embodiments, the content feature is extracted as $c_i = E_c(p_i)$, $c_i \in \mathbb{R}^{H_c \times W_c \times C_c}$. Furthermore, the spatially expanded scene-graph feature $t_i$ is combined with $c_i$ to include more semantics.

At operation 1110, the system generates location information for the first image and for the second image based on the corresponding content features. In some cases, the operations of this step refer to, or may be performed by, image generator network as described with reference to FIGS. 4-6.

At operation 1115, the system pastes the first image and the second image into a composite image based on the location information. In some cases, the operations of this step refer to, or may be performed by, image generator network as described with reference to FIGS. 4-6. Referring to FIG. 6, the new feature is interpolated and pasted onto a specific region of a zero feature map with the shape $$\mathbb{R}^{\frac{H}{2^{N-j}} \times \frac{W}{2^{N-j}} \times (C_c + C_t)},$$

where the location of the region is determined by the location $b_i$ scaled by $$\frac{1}{2N-1}$$

and N is the number of output scales of the image generator network. In some examples, $\hat{c}_i$ denotes the final pasted feature.

Figure 12:
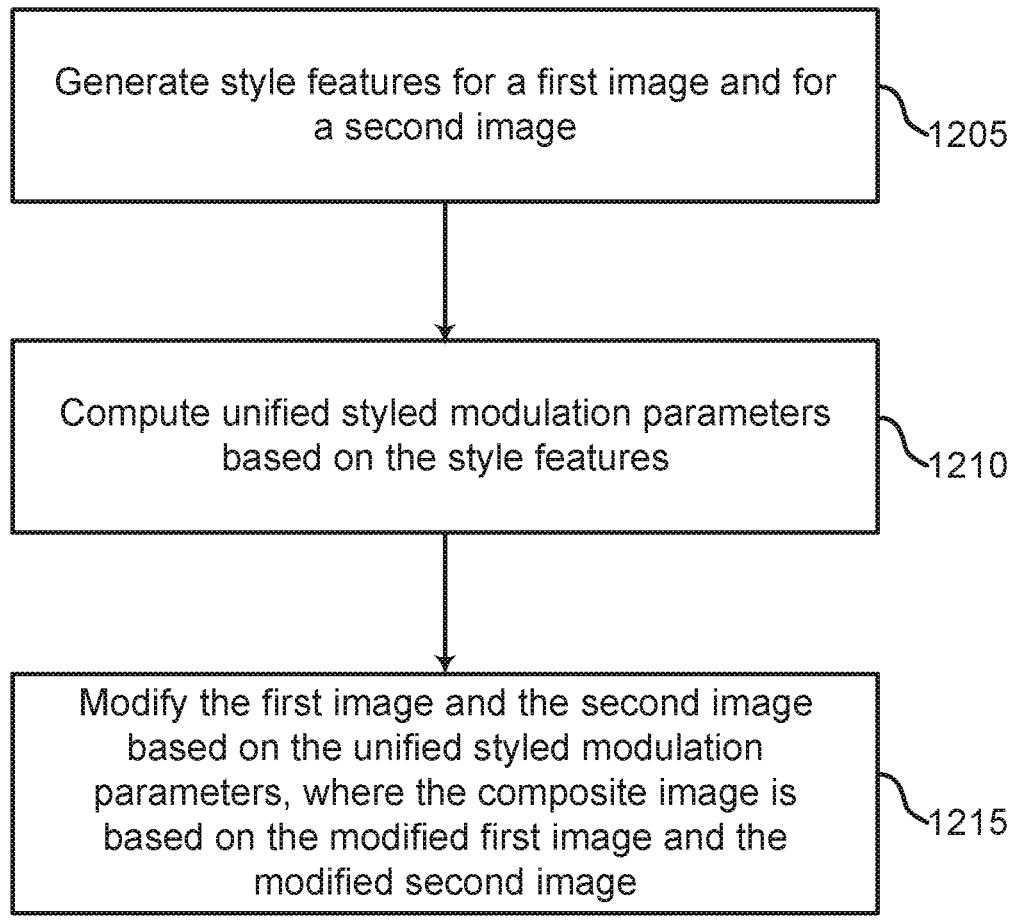
FIG. 12 shows an example of modifying an image based on unified styled modulation parameters according to aspects of the present disclosure.

FIG. 12 shows an example of modifying an image based on unified styled modulation parameters according to aspects of the present disclosure. FIG. 12 illustrates a process of generating a composite image described with reference to FIG. 7. The image generator network (e.g., through a style unify component of the network) as described in FIGS. 4 and 6 modify the image based on unified styled modulation parameters. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system generates style features for a first image and for a second image. In some cases, the operations of this step refer to, or may be performed by, image generator network as described with reference to FIGS. 4-6. Referring to FIG. 6, the style feature is extracted as $s_i = E_s(p_i)$, $s_i \in \mathbb{R}^{C_s}$.

At operation 1210, the system computes unified styled modulation parameters based on the style features. In some cases, the operations of this step refer to, or may be performed by, image generator network as described with reference to FIGS. 4-6. The style unify component 615 (see FIG. 6) takes the averaged style features of all object crops as input and generates modulation parameters as output. In some cases, the modulation parameters can be applied to normalize the channels of each content feature $\hat{c}_i$ independently.

$$\gamma_s, \beta_s = StyleUnifier\left(\frac{s_1 + \ldots + s_n}{n}\right), \gamma_s, \beta_s \in \mathbb{R}^{C_c + C_t}, \quad (1)$$

$$\hat{c}_i = \gamma_s \frac{\hat{c}_i - \mu_i}{\sqrt{\sigma_i + \epsilon}} + \beta_s, \hat{c}_i \in \mathbb{R}^{\frac{H}{2^{N-j}} \times \frac{W}{2^{N-j}} \times (C_c + C_t)}$$

where the style unify component 615 is implemented via a multi-layer perceptron (MLP) with several non-linear layers. $\mu_i$ and $\sigma_1$ are the mean and variance of the content feature $\hat{c}_i$ and $\epsilon$ is a small positive constant for numerical stability. Finally, the normalized content features of all crops are aggregated to represent the generator input at the level with maximum coarseness, i.e., $\hat{c}^1 = \Sigma_{i=1}^n c_i$.

An MLP is a feed forward neural network that typically consists of multiple layers of perceptrons. Each component perceptron layer may include an input layer, one or more hidden layers, and an output layer. Each node may include a nonlinear activation function. An MLP may be trained using backpropagation (i.e., computing the gradient of the loss function with respect to the parameters).

At operation 1215, the system modifies the first image and the second image based on the unified styled modulation parameters, where the composite image is based on the modified first image and the modified second image. In some cases, the operations of this step refer to, or may be performed by, image generator network as described with reference to FIGS. 4-6.

TRAINING AND EVALUATION

Figure 13:
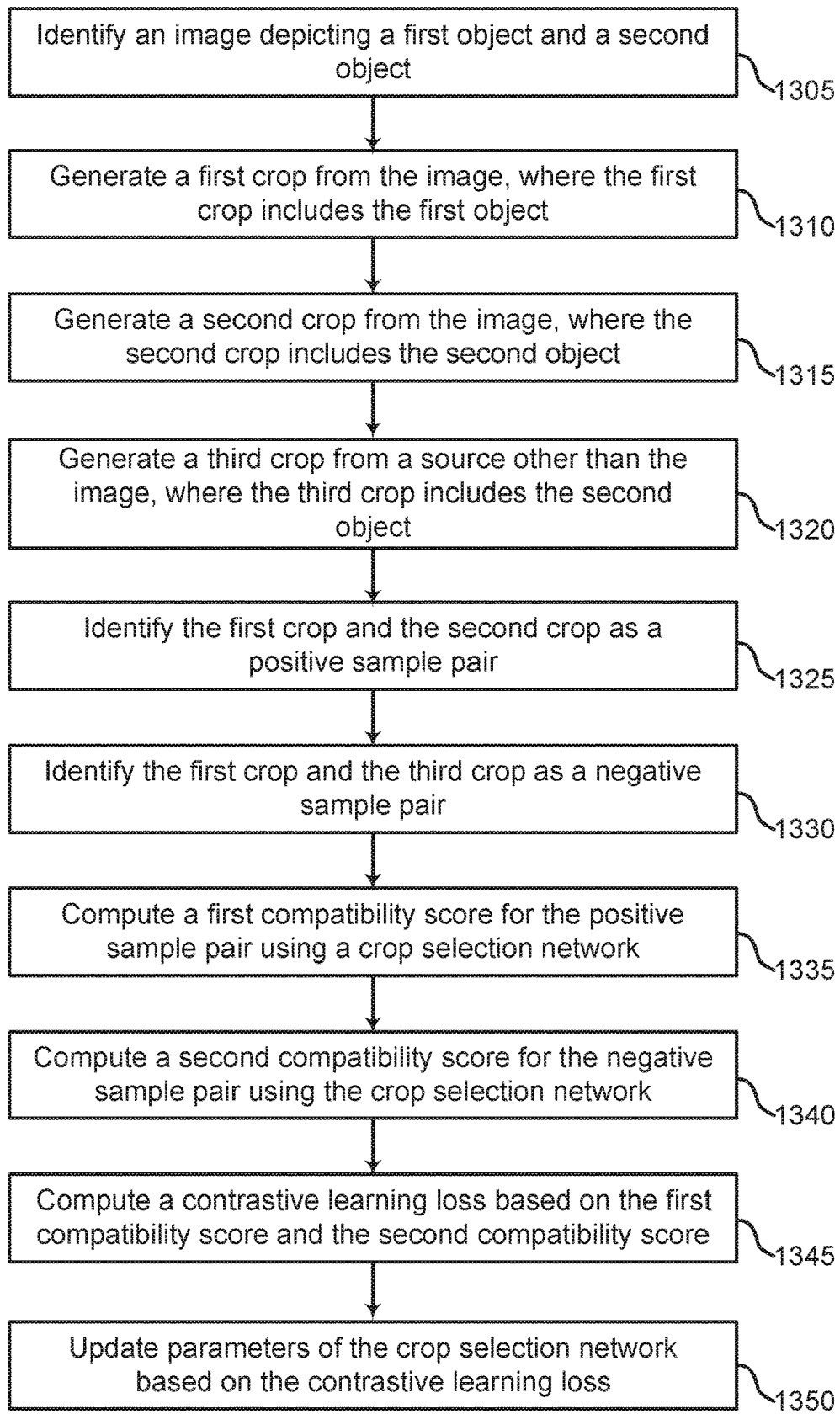
FIG. 13 shows an example of training a neural network according to aspects of the present disclosure.
Figure 14:
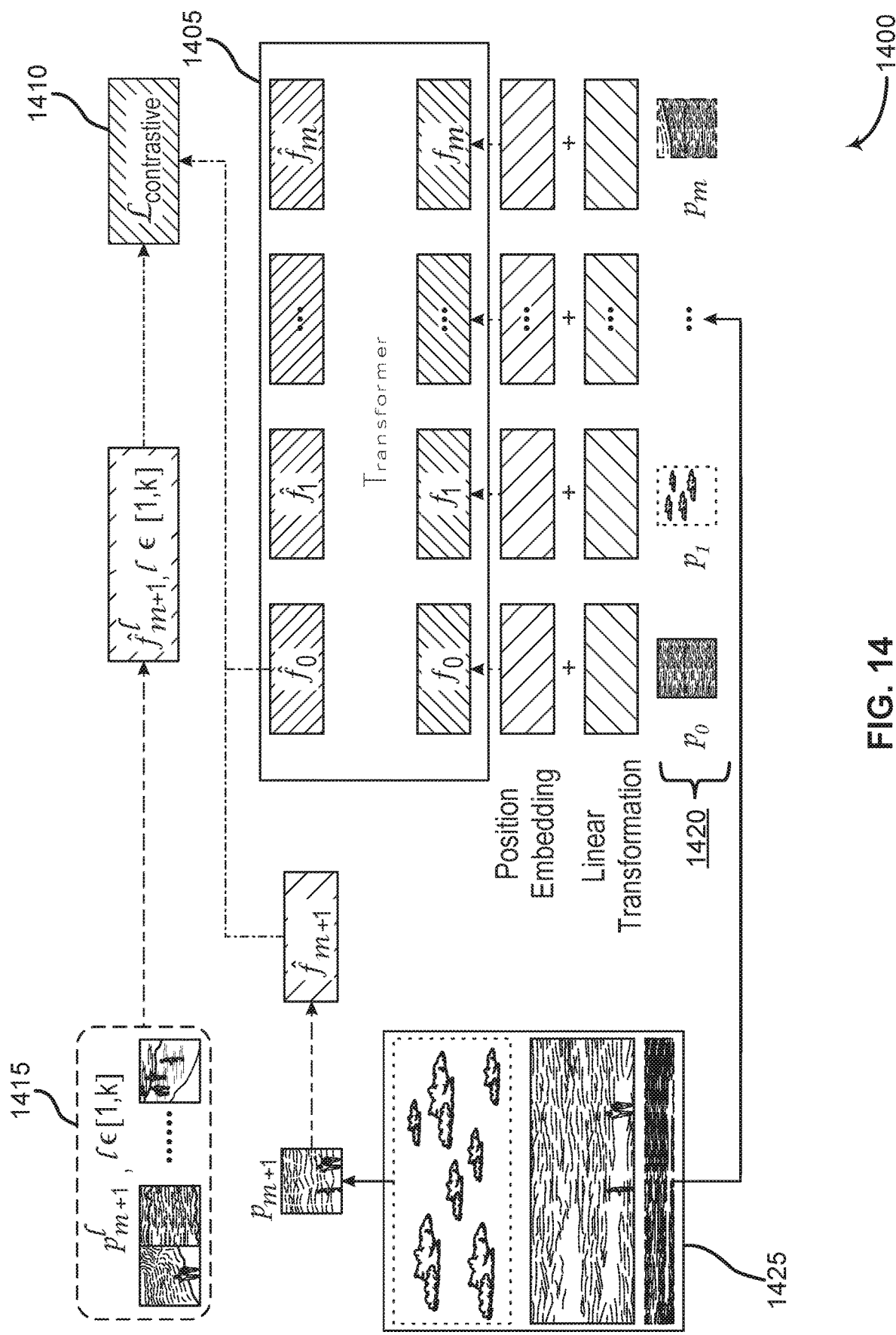
FIG. 14 shows an example of training a crop selection network using contrastive learning according to aspects of the present disclosure.

In FIGS. 13-14, a method, apparatus, and non-transitory computer readable medium for training a neural network are described. One or more embodiments of the method, apparatus, and non-transitory computer readable medium include identifying an image depicting a first object and a second object; generating a first crop from the image, wherein the first crop includes the first object; generating a second crop from the image, wherein the second crop includes the second object; generating a third crop from a source other than the image, wherein the third crop includes the second object; identifying the first crop and the second crop as a positive sample pair; identifying the first crop and the third crop as a negative sample pair; computing a first compatibility score for the positive sample pair using a crop selection network; computing a second compatibility score for the negative sample pair using the crop selection network; computing a contrastive learning loss based on the first compatibility score and the second compatibility score; and updating parameters of the crop selection network based on the contrastive learning loss.

Some examples of the method, apparatus, and non-transitory computer readable medium further include generating a composite image based on a first image depicting a first object and a second image depicting a second object using an image generator network. Some examples further include comparing the composite image to a ground truth image to obtain a reconstruction loss. Some examples further include updating parameters of the image generator network based on the reconstruction loss.

Some examples of the method, apparatus, and non-transitory computer readable medium further include generating a perceptual loss based on the composite image and the ground truth image, wherein the parameters of the image generator network are based on the perceptual loss.

Some examples of the method, apparatus, and non-transitory computer readable medium further include generating an adversarial loss based on the composite image and the ground truth image, wherein the parameters of the image generator network are based on the adversarial loss.

Some examples of the method, apparatus, and non-transitory computer readable medium further include generating a plurality of composite images at different scales. Some examples further include generating a consistency loss based on the plurality of composite images, wherein the parameters of the image generator network are based on the consistency loss.

FIG. 13 shows an example of training a neural network according to aspects of the present disclosure. In some examples, these operations are performed by a system including a processor executing a set of codes to control functional elements of an apparatus, e.g., using a training component 420 as described in FIG. 4. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Crop selection network as described in FIGS. 4 and 5 is trained using contrastive learning. Contrastive learning refers to a type of machine learning in which a model is trained using the selection of positive and negative sample pairs. Contrastive learning can be used in either a supervised or unsupervised (e.g., self-supervised) training context. A loss function for a contrastive learning model can encourage a model to generate similar results for positive sample pairs, and dissimilar results for negative sample pairs. In self-supervised examples, positive samples can be generated automatically from input data (e.g., by cropping or transforming an existing image).

At operation 1305, the system identifies an image depicting a first object and a second object. In some cases, the operations of this step refer to, or may be performed by, training component as described with reference to FIG. 4.

At operation 1310, the system generates a first crop from the image, where the first crop includes the first object. In some cases, the operations of this step refer to, or may be performed by, training component as described with reference to FIG. 4.

At operation 1315, the system generates a second crop from the image, where the second crop includes the second object. In some cases, the operations of this step refer to, or may be performed by, training component as described with reference to FIG. 4.

At operation 1320, the system generates a third crop from a source other than the image, where the third crop includes the second object. For example, the third crop is from a different image. In some cases, the operations of this step refer to, or may be performed by, training component as described with reference to FIG. 4.

In some examples, the crop selection network is trained using a contrastive learning loss, which pushes apart dissimilar pairs (referred to as negative pairs) while pulling together similar pairs (referred to as positive pairs). In some examples, an object crop from the same image as a target object is identified as a positive crop. The object crop and the target object form a positive pair. Additionally, an object crop from a different image as the target object is identified as a negative crop. The object and the target object form a negative pair. The constative learning loss is then computed based on the embeddings of the positive crop and the negative crop with regard to the target object.

At operation 1325, the system identifies the first crop and the second crop as a positive sample pair. In some cases, the operations of this step refer to, or may be performed by, training component as described with reference to FIG. 4. In some examples, the first crop and the second crop are likely from a same image and hence identified as a positive sample pair for training the crop selection network.

At operation 1330, the system identifies the first crop and the third crop as a negative sample pair. In some cases, the operations of this step refer to, or may be performed by, training component as described with reference to FIG. 4. In some examples, the first crop and the third crop are likely from different images and hence identified as a negative sample pair for training the crop selection network.

At operation 1335, the system computes a first compatibility score for the positive sample pair using a crop selection network. In some cases, the operations of this step refer to, or may be performed by, crop selection network as described with reference to FIGS. 4, 5, and 14.

At operation 1340, the system computes a second compatibility score for the negative sample pair using the crop selection network. In some cases, the operations of this step refer to, or may be performed by, crop selection network as described with reference to FIGS. 4, 5, and 14. In some cases, a chosen crop set P from the same image is given. The compatibility score between P and a new crop from the same image should be higher than the compatibility score between P and a new candidate crop from a different image. The contrastive learning loss is used to train the crop selection network to select object crops likely belonging to the same image, and thus increases compatibility among the selected crops.

At operation 1345, the system computes a contrastive learning loss based on the first compatibility score and the second compatibility score. In some cases, the operations of this step refer to, or may be performed by, training component as described with reference to FIG. 4. Detail regarding the contrastive learning loss for training the crop selection network will be described in FIG. 14.

At operation 1350, the system updates parameters of the crop selection network based on the contrastive learning loss. In some cases, the operations of this step refer to, or may be performed by, training component as described with reference to FIG. 4.

The system includes other losses to train the image generator network as described in FIGS. 4 and 6. Given the generated image output at the j-th scale, multiple losses are used to train the image generator network. Training dataset includes ground truth crops and bounding boxes for each object in a training image y with a paired scene graph. Thus, the generated output $x^j$ can reconstruct $(y)^{\downarrow j}$, where $(\bullet)^{\downarrow j}$ denotes the operation of down-sampling an image to the j-th scale.

$$\mathcal{L}_r^j = \mathbb{E}\left[\|(y)^{\downarrow j} - x^j\|_2\right] \qquad (2)$$

The perceptual loss is used to compare $x^j$ with $(y)^{\downarrow j}$ using features $(\Phi_k)$ pretrained on a hierarchical image dataset (e.g., ImageNet) using deep convolutional networks (e.g., VGG) as follows:

$$\mathcal{L}_p^j = \sum_l \mathbb{E}\left[\|\Phi_l((y)^{\downarrow j}) - \Phi_l(x^j)\|_2\right] \qquad (3)$$

VGG is a pre-trained convolutional neural network which learns to extract features that can distinguish the objects and the neural network can classify unseen objects. Additionally, the adversarial loss is applied with a discriminator Di at the j-the scale, as follows:

$$\mathcal{L}_d^j = \mathbb{E}\left[(D^j((y)^{\downarrow j}) - 1)^2 + (D^j(x^j))^2\right],$$

$$\mathcal{L}_g^j = \mathbb{E}\left[(D^j(x^j) - 1)^2\right] \qquad (4)$$

Furthermore, a consistency loss is used to encourage the similarity between the generated outputs at different scales, as follows:

$$\mathcal{L}_c = \sum_{j=1}^{N-1} \mathbb{E}\left[\|(z^N)^{\downarrow j} - x^j\|\right] \qquad (5)$$

In some cases, retrieved crops and predicted bounding boxes are used to generate a new image $\tilde{x}^j$ without a corresponding ground truth image. Therefore, the adversarial loss and consistency loss are applied. Finally, the total loss to train the image generator network (see FIG. 6) at all scales is formulated as follows:

$$\mathcal{L} = \lambda_1 \sum_{x^j,j} \mathcal{L}_r^j + \lambda_2 \sum_{x^j,j} \mathcal{L}_p^j + \zeta_3 \sum_{x^j,\tilde{x}^j,j} \mathcal{L}_g^j + \lambda_4 \sum_{x^j,\tilde{x}^j} \mathcal{L}_c \qquad (6)$$

where $\lambda_1$ to $\lambda_4$ are parameters to balance various losses.

In some examples, the crop selection network and the image generator network are trained with 90 epochs on both the COCO Stuff and Visual Genome datasets. An Adam optimizer may be used with a batch size of 16. The learning rates for the image generator network and the discriminator are both 0.0001. The exponential decay rates ($\beta_1$, $\beta_2$) are set to be (0, 0.9). In some examples, hyper-parameters are set as: $\lambda_1=1.0$, $\lambda_2=1.0$, $\lambda_3=0.02$, and $\lambda_4=1.0$. For training the crop selection network, the proportion between positive samples and negative samples is 1:10. The number of candidate crops for each object during inference is 5. The crop size is set to 64×64 and 32×32 for COCO Stuff and Visual Genome datasets.

FIG. 14 shows an example of training a crop selection network 1400 using contrastive learning according to aspects of the present disclosure. FIG. 14 illustrates a system and process of training a crop selection network (FIGS. 4 and 5) where parameters of the crop selection network are updated based on the contrastive learning loss described with reference to FIG. 13. The example shown includes crop selection network 1400, transformer network 1405, contrastive learning loss 1410, candidate images 1415, previous images 1420, and composite image 1425. Crop selection network 1400 is an example of, or includes aspects of, the corresponding element described with reference to FIGS. 4 and 5.

The crop selection network 1400 is configured to select a crop corresponding to an object in image description to synthesize the final image (e.g., a composite image). In some cases, the crop is selected from k candidate crops associated with each object. The crop selection network 1400 performs the crop selection operation in an iterative fashion. For example, in case there are $m \in [1, n]$ crops $p_1, \ldots, p_m$ are selected for object . . . , $o_m$. In some cases, the set { . . . , . . . , $p_m$} can be defined as the chosen crop set P including one or more object crops selected from previous iterations. Given a new object $o_{m+1}$, crop selection network 1400 selects one crop from the associated k candidate crops which is most compatible with all the existing crops in P. The associated k candidate crops may also be referred to as candidate images 1415. As a result, the crop selection network 1400 ensures that the synthesized image looks realistic. In some cases, the crop selection network 1400 is trained using custom contrastive learning loss 1410. Given a chosen crop set P from the same image, the compatibility score between P and a new crop from the same image should be higher than the compatibility score between P and a new crop from a different image. The learning objective enables the crop selection network 1400 to select object crops likely belonging to the same image, and thus increases compatibility among the selected crops.

In some examples, crop selection network 1400 includes transformer network 1405 during training. For every crop $p_i \in P$ with the corresponding predicted bounding box location $b_i$, the appearance and position information are embedded as an input token to the transformer as $f_i = W_1 \cdot p_i + E_b(b_i)$, where $W_1$ is a trainable linear transformation matrix to convert $p_i$ into a 1-dimensional embedding with shape $\mathbb{R}^{C_p}$. $E_b$ is a position encoder with three non-linear layers and the output shape also $\mathbb{R}^{C_p}$. Additionally, a learnable start token $f_0$ is added to represent the overall compatible feature of all the input tokens. The appearance input $p_0$ is randomly initialized with the normal distribution while the position input is initialized with $b_{m+1}$, which is the predicted bounding box location of the new object $o_{m+1}$. In some cases, the crop selection network 1400 uses the position information of each crop.

In some examples, the transformer network 1405 includes six layers, each of which includes multi-head self-attention and multi-layer perceptron (MLP). The output embedding of the start token is denoted as $\hat{f}_0 \in \mathbb{R}^{C_p}$. Given a new candidate crop $p_{m+1}^l$, $l \in [1, k]$, an additional trainable linear matrix $W_2$ is applied with the same shape as $W_1$ to obtain the appearance features as $\hat{f}_{m+1}^l = W_2 \cdot p_{m+1}^l$. Next, the compatibility score with the chosen crop set P is computed as the cosine similarity between their embeddings, i.e., $\hat{f}_0 \cdot \hat{f}_{m+1}^l$. The embeddings are normalized to the unit hypersphere before matching.

Given an image with the corresponding paired scene graph, the crop selection network 1400 randomly selects a crop set $P = \{p_1, \ldots, p_m | m \in [1, n)\}$ from the image during training. The crop set P includes previous images 1420. The size m is randomly determined to mimic the iterative selection process for inference. Then for a new object $o_{m+1}$, its crop $p_{m+1}$ from the original image is treated as the positive crop while the retrieved candidate crops $\{p_{m+1}^l, \ldots, p_{m+1}^k\}$ from different images are treated as negative crops. The retrieved candidate crops may also be referred to as candidate images 1415. The contrastive loss for this training image can be defined as follows:

$$\mathcal{L}_{contrastive} = -\log \frac{\exp(\hat{f}_0 \cdot \hat{f}_{m+1}/\tau)}{\exp(\hat{f}_0 \cdot \hat{f}_{m+1}/\tau) + \sum_{l=1}^{k} \exp(\hat{f}_0 \cdot \hat{f}_{m+1}^l/\tau)} \quad (7)$$

where $\hat{f}_{m+1}$ and $\hat{f}_{m+1}^l$ are the embeddings of the positive crop $p_{m+1}$ and a negative crop $p_{m+1}^l \cdot \tau$ is a positive scalar temperature parameter.

Given a scene graph and the candidate crops, since initially there is no crop selected for any object, the crop selection network 1400 randomly samples one object and randomly sets one of its candidate crops as the chosen crop during inference. Next, for each remaining object $o_i (i \in (2, n])$, the trained crop selection network 1400 is applied once to find its candidate crop with the highest compatibility score. In some cases, the identified crop (i.e., crop with the highest score) is added into the chosen crop set P. The process is repeated till each object includes a corresponding selected crop. Then, object crops in the selected crops set can be used for image synthesis to generate composite image 1425.

Embodiments of the present disclosure include a sequential crop selection network and an image generator network (e.g., a progressive scene graph to image module) to complete semi-parametric image generation from scene graphs to images. In some examples, the contents and locations of previously chosen image crops may determine the selection of image crop for each object in the crop selection network. The sequential crop selection network is implemented with a transformer trained using contrastive learning.

Furthermore, the image generator network uses hierarchical gated convolutions to enhance the areas that are not covered by any image crops. In some cases, a patch-guided spatially adaptive normalization module ensures that the synthesized images highly respect the crops and are consistent with the scene graph. In some examples, the image processing apparatus is evaluated on Visual Genome and COCO-Stuff datasets. The Visual Genome and COCO-Stuff datasets are benchmark datasets for evaluating scene-graph-to-image generation models. Performance of apparatus, systems and methods of the present disclosure have been evaluated, and results indicate embodiments of the present disclosure have obtained increased performance over existing technology. Example experiments demonstrate that the image processing apparatus outperforms conventional systems.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one".

What is claimed is:

1. A method for image processing, comprising:
selecting a first image depicting a first object from a set of candidate images to create a set of selected images;
iteratively selecting a plurality of additional images based on the set of selected images, wherein each iteration for selecting the plurality of additional images includes computing a plurality of compatibility scores between a candidate image from the set of candidate images and each of the set of selected images and adding the candidate image to the set of selected images; and
generating a composite image depicting the first object and a plurality of additional objects corresponding to the plurality of additional images, respectively.

2. The method of claim 1, further comprising:
identifying a scene graph including the first object and a second object;
generating a text embedding of the first object and a text embedding of the second object; and
generating a scene graph embedding of the second object based on the scene graph, the text embedding of the first object, and the text embedding of the second object, wherein the candidate image is selected based on the scene graph embedding.

3. The method of claim 2, further comprising:
generating a scene graph embedding of the first object based on the scene graph;
identifying a plurality of candidate images depicting the first object; and
selecting the first image from the plurality of candidate images depicting the first object.

4. The method of claim 1, wherein iteratively selecting the plurality of additional images comprises:
for each of the plurality of additional images, identifying a plurality of candidate images depicting a target object; and
selecting an image from the plurality of candidate images depicting the target object based on the first image and spatial information of the image using a crop selection network.

5. The method of claim 1, further comprising:
generating bounding box information for each of a plurality of images depicting a second object; and
cropping each of the plurality of images to obtain a plurality of candidate images depicting the second object based on the bounding box information.

6. The method of claim 1, further comprising:
identifying spatial information of the first image;
generating appearance features of the first image; and
combining the spatial information and the appearance features to obtain an embedding of the first image, wherein the plurality of compatibility scores are based at least in part on the embedding of the first image.

7. The method of claim 6, further comprising:
generating an embedding of each of a plurality of candidate images depicting a second object; and
comparing the embedding of each of the plurality of candidate images depicting the second object with the embedding of the first image to obtain a compatibility score.

8. The method of claim 1, further comprising:
generating content features for the first image and for a second image of the plurality of additional images;
generating location information for the first image and for the second image based on corresponding content features; and
pasting the first image and the second image into the composite image based on the location information.

9. The method of claim 8, further comprising:
inpainting a region of the composite image between the pasted first image and the pasted second image.

10. The method of claim 8, further comprising:
performing spatially adaptive normalization of the composite image based on the pasted first image and the pasted second image.

11. The method of claim 1, further comprising:
generating style features for the first image and for a second image of the plurality of additional images;
computing unified styled modulation parameters based on the style features; and
modifying the first image and the second image based on the unified styled modulation parameters, wherein the composite image is based on the modified first image and the modified second image.

12. The method of claim 1, further comprising:
generating a plurality of composite images corresponding to a plurality of scales; and
combining the plurality of composite images to obtain the composite image.

13. A method for training a neural network, comprising:
identifying an image depicting a first object and a second object different from the first object;
generating a first crop from the image, wherein the first crop includes the first object;
generating a second crop from the image, wherein the second crop includes the second object;
generating a third crop from a source other than the image, wherein the third crop includes the second object;
computing a first compatibility score between the first crop and the second crop as a positive sample based on the first crop and the second crop being from a same image;
computing a second compatibility score between the first crop and the third crop as a negative sample based on the first crop and the third crop being from different images;

computing a contrastive learning loss based on the first compatibility score and the second compatibility score; and updating parameters of a crop selection network based on the contrastive learning loss, wherein the crop selection network is trained to iteratively select one or more additional images based on a set of previously selected images by computing a plurality of compatibility scores between a candidate image and each of the set of previously selected images, respectively.

14. The method of claim 13, further comprising:

generating a composite image based on a first image depicting the first object and a second image depicting the second object using an image generator network;

comparing the composite image to a ground truth image to obtain a reconstruction loss; and updating parameters of the image generator network based on the reconstruction loss.

15. The method of claim 14, further comprising:

generating a perceptual loss based on the composite image and the ground truth image, wherein the parameters of the image generator network are based on the perceptual loss.

16. The method of claim 14, further comprising:

generating an adversarial loss based on the composite image and the ground truth image, wherein the parameters of the image generator network are based on the adversarial loss.

17. The method of claim 14, further comprising:

generating a plurality of composite images at different scales; and generating a consistency loss based on the plurality of composite images, wherein the parameters of the image generator network are based on the consistency loss.

18. An apparatus for image processing, comprising:

an image selection component configured to generate a plurality of candidate images depicting a same object;

a crop selection network configured to iteratively select one or more additional images based on a set of previously selected images by computing a plurality of compatibility scores between a candidate image of the plurality of candidate images and each of the set of previously selected images, respectively, wherein each of the plurality of compatibility scores is computed based on position information of a corresponding image of the set of previously selected images; and an image generator network is configured to generate a composite image based on the one or more additional images and the set of previously selected images.

19. The apparatus of claim 18, wherein:

the image selection component comprises a graph convolutional network (GCN) configured to generate a scene graph embedding based on a scene graph including the same object, wherein the plurality of candidate images are generated based on the scene graph embedding.

20. The apparatus of claim 18, wherein:

the image selection component comprises a text encoder configured to generate a text embedding of the same object.

* * * * *